(12) United States Patent
Lee

(10) Patent No.: US 8,363,752 B2
(45) Date of Patent: Jan. 29, 2013

(54) METHODS AND APPARATUS FOR REDUCING THE AVERAGE-TO-MINIMUM MAGNITUDE RATIO OF COMMUNICATIONS SIGNALS IN COMMUNICATIONS TRANSMITTERS

(75) Inventor: Wayne Lee, San Mateo, CA (US)

(73) Assignee: Panasonic Corporation, Osaka (JP)

( * ) Notice: Subject to any disclaimer, the term of this patent is extended or adjusted under 35 U.S.C. 154(b) by 706 days.

(21) Appl. No.: 12/551,929

(22) Filed: Sep. 1, 2009

(65) Prior Publication Data

US 2011/0051836 A1   Mar. 3, 2011

(51) Int. Cl.
*H04L 27/36* (2006.01)
(52) U.S. Cl. .................................................. 375/298
(58) Field of Classification Search .................. 375/298
See application file for complete search history.

(56) References Cited

U.S. PATENT DOCUMENTS

| 7,054,385 | B2 | 5/2006 | Booth et al. | |
|---|---|---|---|---|
| 2005/0281360 | A1* | 12/2005 | Booth et al. | 375/346 |
| 2008/0260065 | A1* | 10/2008 | Ojard | 375/295 |

* cited by examiner

*Primary Examiner* — David C. Payne
*Assistant Examiner* — Tanmay Shah

(57) ABSTRACT

A communications transmitter configured to reduce the average-to-minimum magnitude ratio (AMR) of a communications signal includes a symbol mapper, a pulse-shaping filter, an AMR reduction circuit, and a modulator. The symbol mapper operates to generate a sequence of symbols from a binary-source data stream containing a message to be transmitted, and the pulse-shaping filter generates a baseband signal based on the sequence of symbols. The AMR reduction circuit is configured to compare magnitudes of samples of the baseband signal to a time-varying low-magnitude threshold, and modify the baseband signal to produce a modified baseband signal having a reduced AMR if a sample of the baseband signal is determined to have a magnitude less than the time-varying low-magnitude threshold. Finally, the modulator operates to modulate a carrier signal based on the modulation information contained in the modified baseband signal.

32 Claims, 27 Drawing Sheets

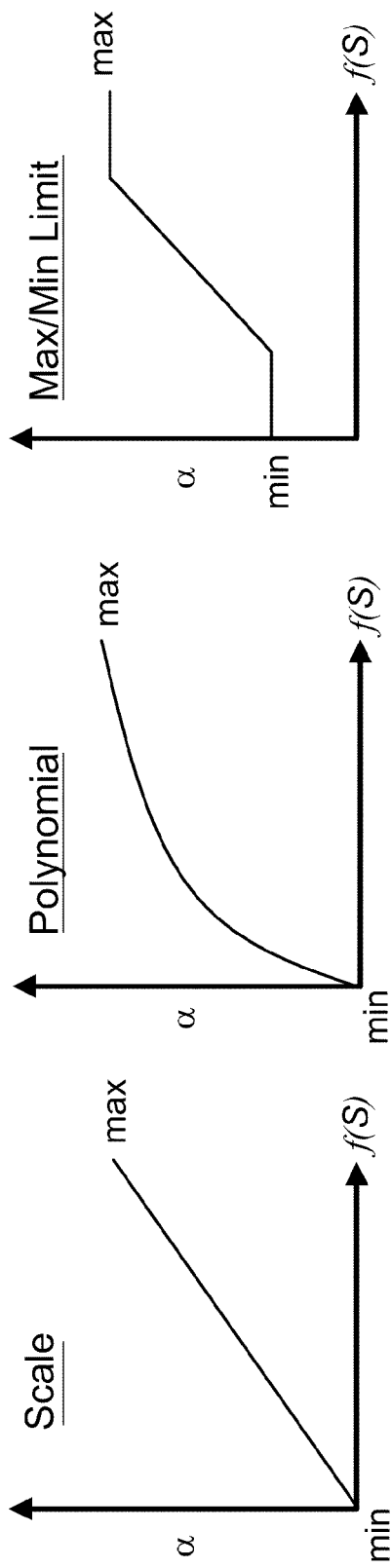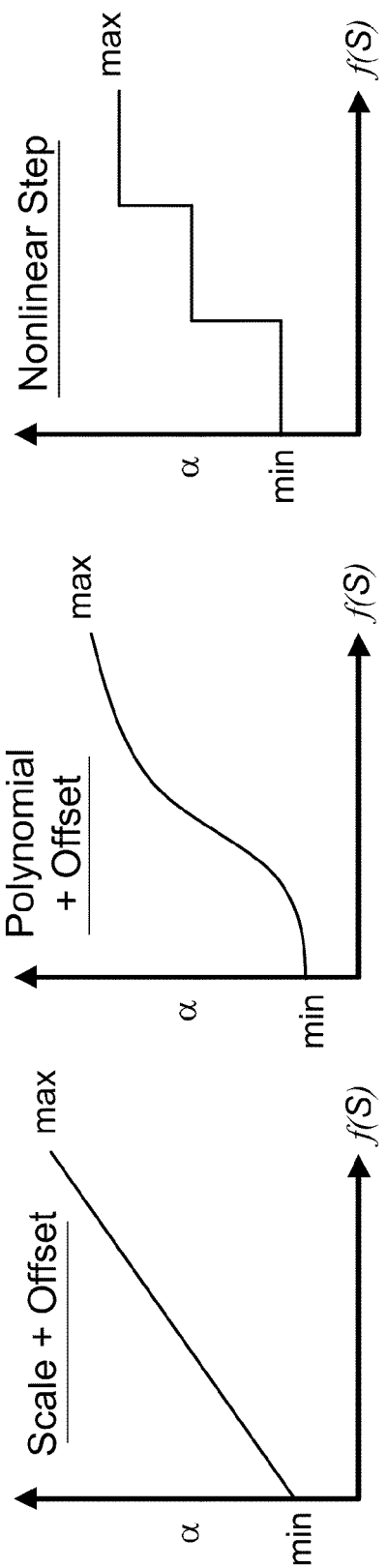
FIGURE 11A — Scale
FIGURE 11B — Polynomial
FIGURE 11C — Max/Min Limit
FIGURE 11D — Scale + Offset
FIGURE 11E — Polynomial + Offset
FIGURE 11F — Nonlinear Step

| | ACLR5(-) (dBc) | ACLR5(+) (dBc) | ACLR10(-) (dBc) | ACLR10(+) (dBc) | RXN45 (dBm/100kHz) | EVM (%) |
|---|---|---|---|---|---|---|
| 3GPP Specification | -33 | -33 | -43 | -43 | - | 17.5 |
| HB w/o FIR | -46.74 | -46.38 | -55.04 | -55.09 | -71.92 | 5.43 |
| Adaptive HB w/o FIR | -45.3 | -44.96 | -55.91 | -55.95 | -74.52 | 5.84 |
| Adaptive HB w/ PM FIR | -45.34 | -45.02 | -55.51 | -55.56 | -80.91 | 6.04 |
| Adaptive HB w/ AM FIR | -46.65 | -46.23 | -59.31 | -59.09 | -77.69 | 5.78 |
| Adaptive HB w/ AM and PM FIR | -46.72 | -46.32 | -59.07 | -58.87 | -83.16 | 5.98 |

METHODS AND APPARATUS FOR REDUCING THE AVERAGE-TO-MINIMUM MAGNITUDE RATIO OF COMMUNICATIONS SIGNALS IN COMMUNICATIONS TRANSMITTERS

FIELD OF THE INVENTION

The present invention relates to communications systems and methods. More specifically, the present invention relates to methods and apparatus for reducing the average-to-minimum magnitude ratio (AMR) of communications signals in communications transmitters.

BACKGROUND OF THE INVENTION

A key and essential component of every radio frequency (RF) communications system is the RF transmitter. As shown in FIG. 1, an RF transmitter 100 generally comprises a baseband modulator 102, a frequency upconverter 104, a power amplifier (PA) 106, and an antenna 108. The purpose of the baseband modulator 102 is to generate a baseband signal s(t) that contains a message to be transmitted and which is formatted in accordance with a predetermined modulation scheme. The purpose of the frequency upconverter 104 is to upconvert the baseband signal s(t) to RF, so that the message is capable of being propagated through space (i.e., transmitted over the air) to a remote receiver. The PA 106 is employed to increase the power of the RF signal before it is radiated by the antenna 108, thereby compensating for attenuation of the RF signal as it is transmitted over the air to the remote receiver.

In modern RF transmitters, the message to be transmitted is included in a binary-source data stream. The baseband modulator 102 groups the data bits in the binary-source data stream into a sequence of N-bit words, where N is some positive integer, and maps the pattern of bits in each N-bit word to one of $M=2^N$ possible symbols. The M symbols define the modulation scheme being employed, and affect how the amplitude and/or angle of the RF carrier signal is varied (i.e., modulated) to carry the message in the original binary-source data stream to the remote receiver. By mapping each N-bit word to one of M possible symbols, $N=\log_2 M$ bits can be transmitted in each symbol.

The symbols generated by the baseband modulator 102 comprise a sequence of weighted impulses. To limit the bandwidths of the impulses, the baseband modulator 102 is further configured to shape each impulse by a band-limiting pulse p(t).

Mathematically, the baseband signal s(t) can be expressed as:

$$s(t) = \sum_n a_n p(t - nT_s),$$

where n is a symbol index, $a_n$ is the $n^{th}$ symbol in the sequence of symbols, p(t) is the pulse at time t, and $T_s$ is the symbol period. Each $a_n$ is either a real or complex number having one of M possible states. For example, in the quadrature phase-shift keying (QPSK) modulation scheme, M=4, and $a_n$ is given by $a_n = e^{j\pi(2d_n+1)/2}$, where $d_n$ is an integer selected from the set {0, 1, 2, 3}.

Because the baseband signal s(t) is in general a complex signal, it is usually expressed in terms of its in-phase (I) and quadrature (Q) components, i.e., as s(t)=I(t)+jQ(t), and the baseband modulator 102 is configured to generate separate pulse-shaped I and Q baseband signals for each of the I and Q channels. This is illustrated in FIG. 2, which is simplified drawing of a typical RF transmitter 200. The RF transmitter 200 comprises a baseband modulator 202; I-channel and Q-channel digital-to-analog converters (DACs) 204 and 206; a transmit local oscillator (Tx-LO) 208; a quadrature modulator 210; a PA 212; and an antenna 214. Due to its use of the quadrature modulator 210, the RF transmitter 200 is referred to in the description below as the "quadrature-modulator-based" transmitter 200.

The quadrature modulator 210 of the quadrature-modulator-based transmitter 200 includes an I-channel mixer 216, a Q-channel mixer 218, a ninety-degree phase shifter 220, and a combiner 222. The I-channel and Q-channel DACs 204 and 206 convert the pulse-shaped I and Q baseband signals from the baseband modulator 202 into analog I and Q baseband signals. The quadrature modulator 210 then upconverts the analog I and Q baseband signals to RF. Specifically, the I-channel mixer 216 mixes the analog I baseband signal with an RF carrier signal provided by the Tx-LO 208, while the Q-channel mixer 218 mixes the analog Q baseband signal with a ninety-degree phase-shifted version of the RF carrier signal produced at the output of the ninety-degree phase shifter 220, thereby producing upconverted I- and Q-channel RF carrier signals. The upconverted I- and Q-channel RF carrier signals are then combined by the combiner 222 to produce the desired modulated RF carrier signal, which is finally amplified by the PA 212 and radiated over the air to a remote receiver by the antenna 214.

The quadrature-modulator-based RF transmitter 200 is satisfactory for many applications. However, it is not the most desirable solution when used in communication systems employing non-constant envelope modulation schemes. Current and next generation mobile telecommunications systems commonly employ non-constant envelope modulation schemes to achieve higher data rates for a given bandwidth of the RF spectrum than can be realized using constant envelope modulation schemes. However, as explained below, their use in quadrature-modulator-based RF transmitters requires a sacrifice of energy efficiency.

A non-constant envelope modulation scheme produces a baseband signal that has a non-constant (i.e., time-varying) envelope. Consequently, and as illustrated in FIG. 3, the modulated RF carrier signal presented to the RF input RFin of the PA 212 also has a non-constant envelope. To prevent the PA 212 from clipping the signal peaks of the modulated RF carrier signal, the input signal power to the PA 212 must be reduced. This technique, known as power back-off, ensures that the PA 212 always operates in its linear region of operation, even during times when the magnitude of the modulated RF carrier signal is at its peak. Unfortunately, while power back-off helps to ensure linearity it also undesirably results in a reduction in energy efficiency.

The energy efficiency of an RF transmitter is determined in large part by how efficient the RF transmitter's PA is, since the PA is usually the dominant consumer of energy in the RF transmitter. The energy efficiency of the PA is determined by the ratio of the PA RF output power to the direct current (DC) power supplied to the PA from the RF transmitter's power supply. Consequently, when power back-off is employed the energy efficiency of the RF transmitter is reduced. The reduction in energy efficiency is most severe for signals that have a high peak-to-average ratio (PAR). Unfortunately, many modern non-constant envelope schemes produce signals having high PARs.

An RF transmitter having low energy efficiency is undesirable in most any circumstance. It is particularly undesirable when the RF transmitter comprises a battery-powered RF transmitter, such as used in a cellular handset, since the low energy efficiency results in shortened battery life. Fortunately, an alternative type of communications transmitter known as a polar transmitter is available which avoids the linearity versus energy efficiency tradeoff that plagues the quadrature-modulator-based transmitter 200. In a polar transmitter the amplitude information (i.e., the signal envelope) is temporarily removed from the non-constant envelope signal while the remaining signal, which has a constant envelope, is upconverted to RF. As explained in more detail below, the previously removed signal envelope is used to modulate the power supplied to the PA as the upconversion process takes place. Because the signal applied to the RF input of the PA has a constant envelope, a more energy efficient nonlinear PA can be used without the risk of signal peak clipping.

FIG. 4 is a drawing showing the salient elements of a typical polar transmitter 400. The polar transmitter 400 comprises a baseband modulator 402; a Coordinate Rotation Digital Computer (CORDIC) converter (i.e., rectangular-to-polar converter) 404; an amplitude path including an amplitude path DAC 406 and amplitude modulator 408; an angle path including an angle path DAC 410 and angle modulator 412; a PA 414; and an antenna 416. The purpose of the CORDIC converter 404 is to convert the digital rectangular-coordinate pulse-shaped I and Q baseband signals from the baseband modulator 402 to digital polar-coordinate amplitude and angle component signals p and θ. The amplitude and angle path DACs 406 and 410 convert the digital amplitude and angle component signals ρ and θ into analog amplitude and angle modulation signals. In the amplitude path, the amplitude modulator 408 then modulates a direct current power supply voltage Vsupply (e.g., as provided by a battery) by the amplitude information in the analog amplitude modulation signal. The resulting amplitude-modulated power supply signal Vs(t) is supplied to the power supply port of the PA 414. Meanwhile, in the angle path, the angle modulator 412 operates to modulate an RF carrier signal by the angle information in the analog angle modulation signal, thereby producing an angle-modulated RF carrier signal which is coupled to the RF input port RFin of the PA 414.

As shown in FIG. 5, the angle-modulated RF carrier signal at the RF input port RFin of the PA 414 has a constant envelope. This permits the PA 414 to be configured to operate in its nonlinear region of operation (i.e., as a "nonlinear" PA) without the risk of signal peak clipping, as was mentioned above, and the PA 414 can be operated without having to back-off the output power. Typically the PA 414 is implemented as a highly-efficient switch-mode PA (e.g., as a Class D, E or F switch-mode PA) switching between compressed and cut-off states. When configured in this manner, the amplitude-modulated power supply signal Vs(t) modulates the power supply port of the PA 414 and the envelope information is restored to the RF output RFout of the PA 414 as the PA 414 amplifies the angle-modulated RF carrier signal. By operating the PA 414 as a switch and dynamically controlling the power supplied to it, the polar transmitter 400 is able to achieve significantly higher energy efficiencies than the quadrature-modulator-based RF transmitter 200.

Although the polar transmitter 400 is able to handle non-constant envelope signals at higher energy efficiencies than the more conventional quadrature-modulator-based transmitter 200, the amplitude and angle component signals ρ and θ typically have much higher bandwidths compared to the rectangular-coordinate I and Q baseband signals from which they derive. This so-called "bandwidth expansion" phenomenon occurs during the rectangular-to-polar conversion process performed by the CORDIC converter 404. The high bandwidths are manifested as high-frequency events in the amplitude and angle component signals ρ and θ and are highly undesirable. Not only do the high-frequency events tend to degrade the modulation accuracy of the polar transmitter 400, they also cause the transmission spectrum to extend beyond its intended band-limited channel, resulting in adjacent channel interferers and an increase in receive band noise. These effects can be very difficult to deal with, especially when strict noise restriction standards must be adhered to.

The extent to which high-frequency events end up appearing in the amplitude and angle component signals ρ and θ is very much dependent on the modulation scheme that is employed. In particular, non-constant modulation schemes that produce signals having a high average-to-minimum magnitude ratio (AMR) generally have a very large angle component bandwidth. In fact, for modulation schemes that produce signals which pass through zero, as illustrated in the signal trajectory diagram in FIG. 6, phase changes by as much as 180 degrees can occur, resulting in an angle component signal θ having essentially infinite bandwidth. Signals of such high bandwidth cannot be accurately processed and transmitted by the polar transmitter 400, or by any type of transmitter for that matter, and the high-frequency content in such signals makes standards compliance extremely difficult, and in some cases impossible, to achieve.

Various techniques have been proposed to reduce high-frequency events in polar domain signals. One approach, known as "hole blowing" involves identifying symbols (or samples of symbols) in the baseband signal s(t) during which the magnitude of the signal falls below a predetermined low-magnitude threshold, and then raising the magnitude of the baseband signal s(t) in the temporal vicinity of the identified symbols or samples so that the AMR of the signal is reduced. The term "hole blowing" is used since the effect of applying the technique is to produce a "hole" in the signal trajectory diagram of the baseband signal s(t). As illustrated in FIG. 7, the "hole" forces the trajectory of the modified baseband signal ŝ(t) to not pass too close to the origin, resulting in a desired reduction in the bandwidth of the signal.

The conventional hole blowing technique is described in U.S. Pat. No. 7,054,385 to Booth et al. As explained there, the baseband signal s(t) is modified by adding correction pulses to it, to form a modified baseband signal:

$$\hat{s}(t) = \sum_n a_n p(t - nT_s) + \sum_m b_m r(t - t_m),$$

where r(t) is the correction pulse, m is the perturbation index, $t_m$ represents the times when the baseband signal s(t) is perturbed (i.e., the times when the correction pulse r(t) is inserted), and $b_m$ is a perturbation sequence representing the amplitude scaling and/or angle shifting applied to the correction pulse r(t).

As shown in FIG. 8, in generating the modified baseband signal ŝ(t) the baseband signal s(t) from the baseband modulator 102 is fed forward to an analyzer 802. The analyzer 802 then determines the perturbation times $t_m$ by detecting low-magnitude events in the baseband signal s(t) that fall below the fixed low-magnitude threshold. In response to detected low-magnitude events, the analyzer 802 generates the perturbation sequence $b_m$. A pulse-shaping filter 804 generates the correction pulses r(t), scales the correction pulses by the perturbation sequence $b_m$, and finally adds the scaled correction pulses to the original baseband signal s(t), to produce the desired AMR-reduced modified baseband signal ŝ(t).

The conventional hole blowing technique can be helpful in reducing the AMR of communications signals in polar transmitters configured to operate in accordance with some types of non-constant envelope modulation schemes. However, it does not always provide satisfactory results. Moreover, for multi-mode polar transmitters that support multiple non-constant envelope modulation schemes, which produce baseband signals having different AMRs, the conventional hole blowing technique is in most cases unacceptable. State-of-the-art multi-mode transmitters, such as those used in modern cellular telecommunications systems, are often designed to operate in both second generation (2G) and third generation (3G) mobile telecommunications systems. 2G mobile telecommunications systems employ Enhanced Data Rates for GSM (Global System for Mobile communications) Evolution (EDGE) to achieve higher data rates. GSM/EDGE uses an 8 phase shift keying (8PSK) non-constant envelope modulation scheme. 3G Wideband Code Division Multiple Access (W-CDMA) telecommunications systems also use non-constant envelope modulation schemes—Hybrid Phase Shift Keying (HPSK) and 16 quadrature amplitude modulation (16QAM), if High-Speed Packet Access (HSPA) protocols are used. The baseband signals generated from these different non-constant envelope modulation schemes all have different AMRs. Unfortunately, the conventional hole blowing approach described above, with its single, fixed low-magnitude threshold, is inadequate, and in many cases entirely incapable of, reducing the AMRs of the different baseband signals to levels necessary to guarantee compliance with the noise restriction specifications of all the various standards.

Long Term Evolution (LTE), the next generation mobile telecommunications technology, will also use a non-constant envelope modulation scheme known as Orthogonal Frequency Division Multiplexing (OFDM). When LTE is deployed, multi-mode transmitters will be designed to support OFDM as well as the non-constant envelope modulation schemes used in legacy W-CDMA systems. Problems associated with reducing the AMRs of signals in those and other next generation multi-mode transmitters will be similar to those encountered in present day GSM/EDGE and W-CDMA multi-mode transmitters.

Considering the drawbacks and limitations of conventional hole blowing approaches, it would be desirable to have methods and apparatus that are effective at reducing the AMR of communications signals in current and next generation communications transmitters.

SUMMARY OF THE INVENTION

Methods and apparatus for reducing the average-to-minimum magnitude ratio (AMR) of communications signals in communications transmitters are disclosed. An exemplary communications transmitter configured to reduce the AMR of a communications signal comprises a symbol mapper, a pulse-shaping filter, an AMR reduction circuit, and a modulator (e.g., a polar modulator or quadrature modulator). The symbol mapper operates to generate a sequence of symbols from a binary-source data stream containing a message to be transmitted, and the pulse-shaping filter generates a baseband signal based on the sequence of symbols. The AMR reduction circuit is configured to compare magnitudes of samples of the baseband signal to a time-varying low-magnitude threshold, and modify the baseband signal to produce a modified baseband signal having a reduced AMR if a sample of the baseband signal is determined to have a magnitude less than the time-varying low-magnitude threshold. Finally, the modulator operates to modulate a carrier signal based on the modulation information contained in the modified baseband signal.

In one embodiment of the invention, the AMR reduction circuit includes a threshold setting circuit configured to vary the time-varying low-magnitude threshold as a function of one or more of the symbols generated by the symbol mapper (e.g., as a function of the magnitude or magnitudes of the one or more symbols). In another embodiment, the threshold setting circuit is configured to set and vary the time-varying low-magnitude threshold as a function of one or more samples of the baseband signal (e.g., as a function of the magnitude or magnitudes of the one or more samples). In either embodiment, the function selected to define the time-varying low-magnitude threshold may comprise a linear or non-linear function.

The AMR-reducing methods and apparatus of the present invention (also referred to herein as the "adaptive hole blowing" methods and apparatus of the present invention) can be employed in basestation transmitters, cellular handset transmitters, or in any transmitter that can benefit from a reduction in the AMR of the transmitter's signals. Further, the AMR-reducing methods and apparatus of the present invention may be used in transmitters configured to transmit in accordance with a single non-constant envelope modulation scheme (i.e., a single-mode transmitter) or in a transmitter that is configurable to transmit in accordance with multiple non-constant envelope modulation schemes (i.e., in a multi-mode transmitter).

The AMR-reducing methods and apparatus of the present invention are well-suited for polar transmitters, to reduce high-frequency events in the amplitude and angle component signals of the polar transmitter. The reduction in high-frequency content in the amplitude and angle component signals results in lower adjacent channel leakage ratios and lower receive band noise. This, together with the ability of the AMR-reducing methods and apparatus to adapt to the incoming symbols, allows noise restriction specifications of standards for multiple communications systems to be more easily adhered to.

Though well-suited for polar transmitters, the AMR-reducing methods and apparatus of the present invention may also be used in other types of transmitters, including quadrature-modulator based transmitters.

Further features and advantages of the present invention, including descriptions of the structure and operation of the above-summarized and other exemplary embodiments of the invention, will now be described in detail with respect to accompanying drawings, in which like reference numbers are used to indicate identical or functionally similar elements.

BRIEF DESCRIPTION OF THE DRAWINGS

FIGS. 11A-F show various types of functions $f(S)$ that may be used to define the variable/adaptive low-magnitude threshold $\alpha = f(S)$ for the AMR reduction circuit of the polar transmitter in FIG. 9;

FIG. 31 is a table comparing the adjacent channel leakage ratio (ACLR), receive band noise (R×N), and error vector magnitude (EVM) performance of various embodiments of the invention using the adaptive hole blowing aspect of the present invention to the ACLR, RxN and EVM performance of a polar transmitter configured to perform hole blowing using a single, fixed low-magnitude threshold.

DETAILED DESCRIPTION

Figure 1:
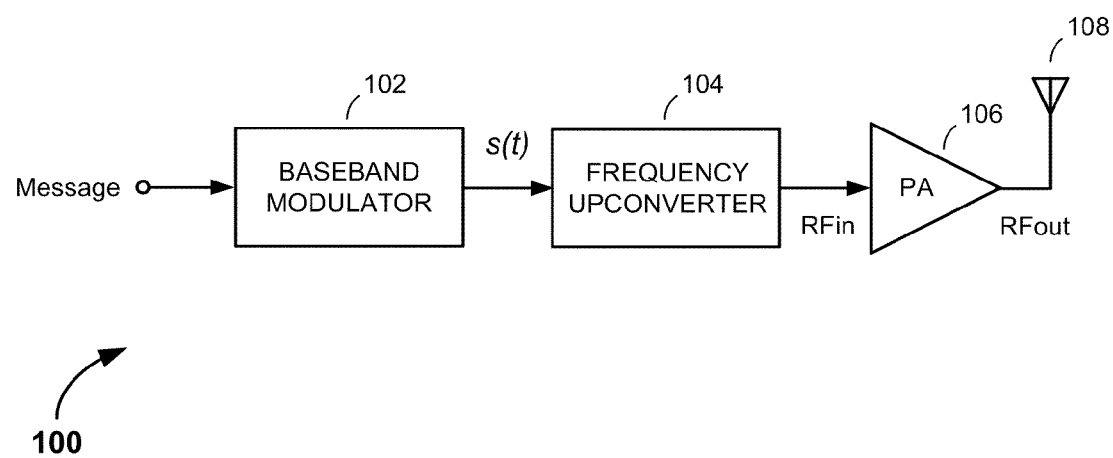
FIG. 1 is a simplified drawing of a radio frequency (RF) transmitter.
Figure 2:
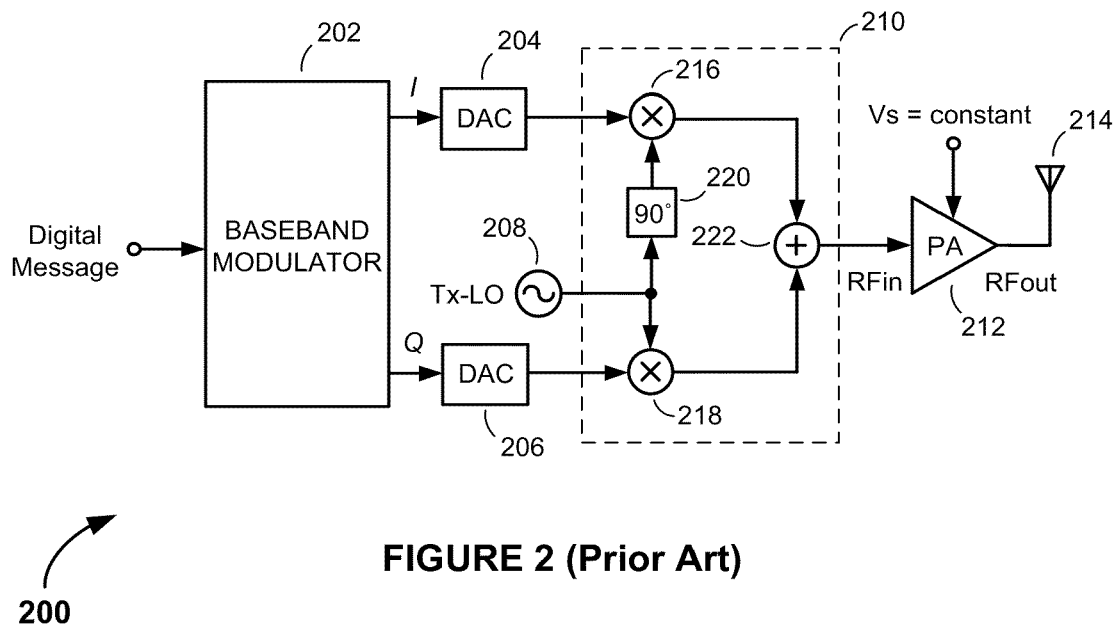
FIG. 2 is a drawing of a conventional quadrature-modulator-based transmitter.
Figure 3:
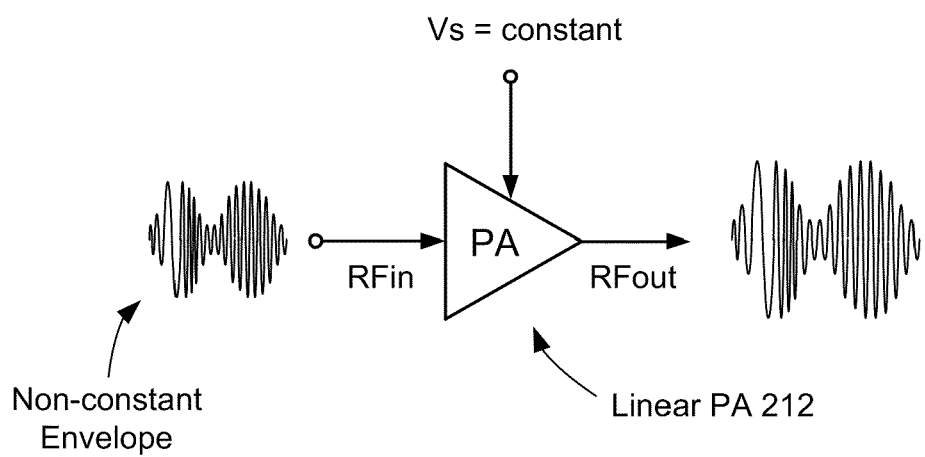
FIG. 3 is a drawing illustrating how the modulated RF carrier signal presented to the RF input port of the power amplifier (PA) of a quadrature-modulator-based transmitter has a non-constant (i.e., time varying) envelope when the quadrature-modulator-based transmitter is configured to operate in accordance with a non-constant envelope modulation scheme.
Figure 4:
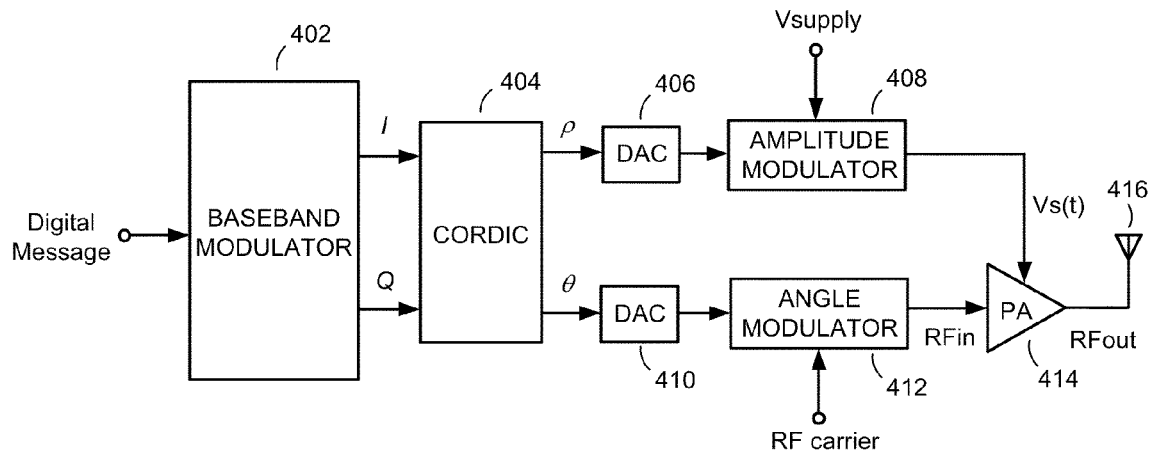
FIG. 4 is a drawing of a conventional polar transmitter.
Figure 5:
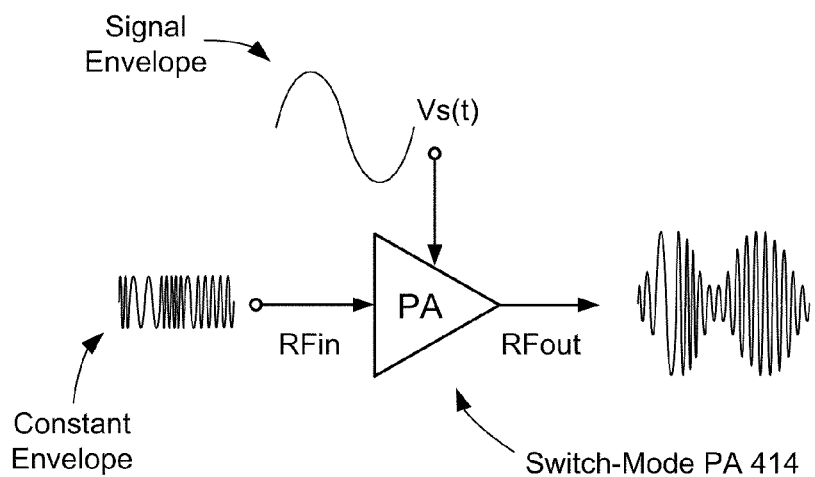
FIG. 5 is a drawing illustrating how the modulated RF carrier signal presented to the RF input port of the PA of a polar transmitter has a constant envelope, even when the polar transmitter is configured to operate in accordance with a non-constant envelope modulation scheme.
Figure 6:
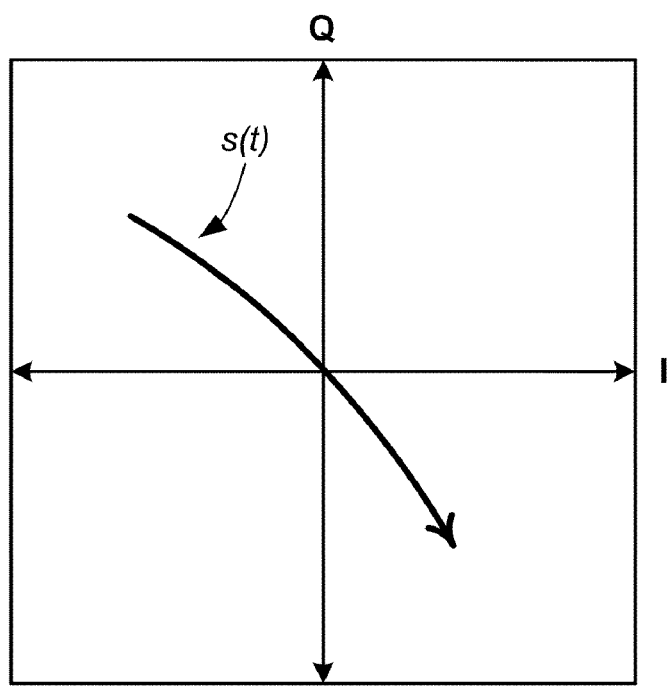
FIG. 6 is a signal trajectory diagram of a baseband signal s(t) that passes through the origin of the complex signal plane.
Figure 7:
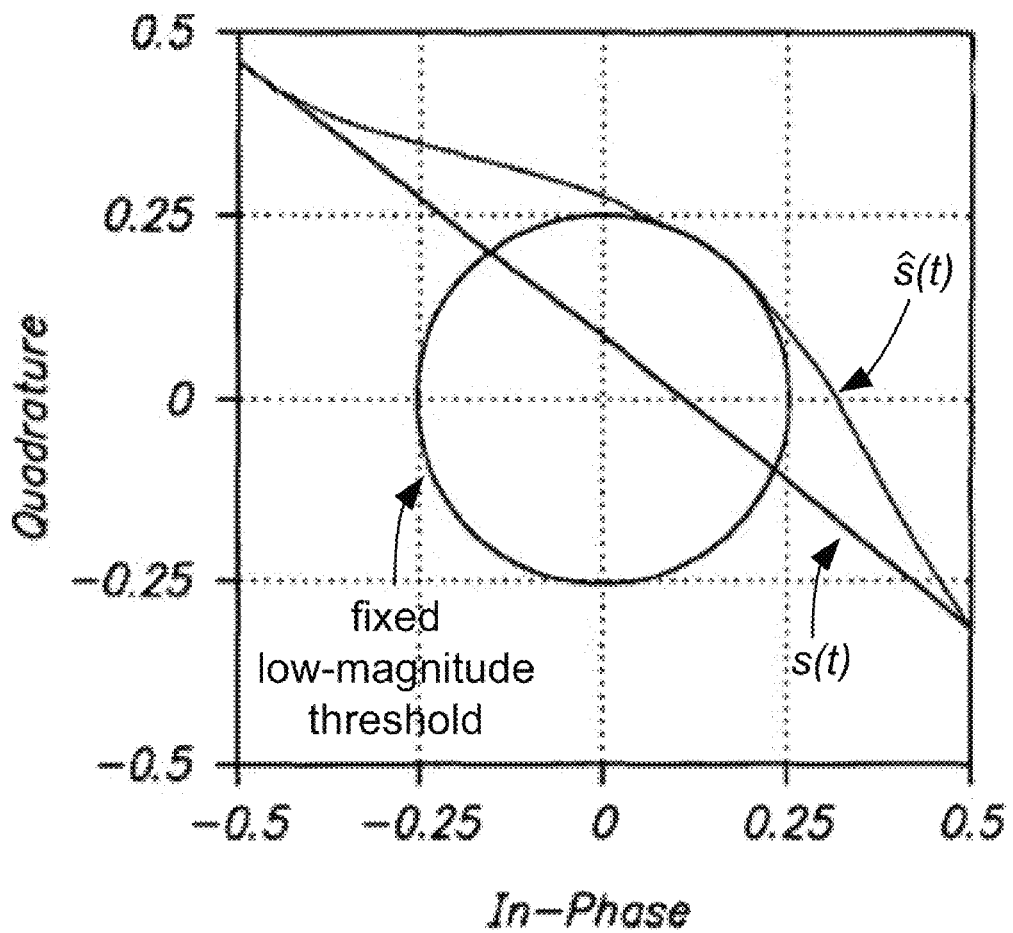
FIG. 7 is a signal trajectory diagram of a baseband signal s(t) and a modified baseband signal ŝ(t) that has been subjected to a conventional hole blowing process.
Figure 8:
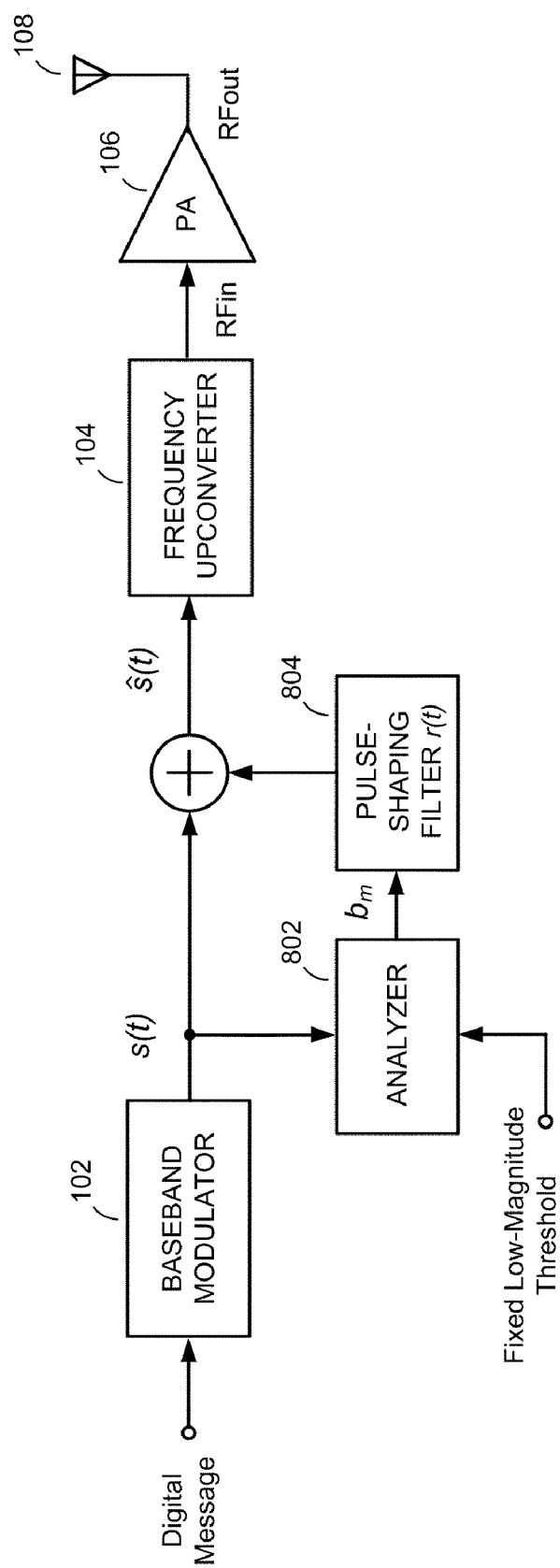
FIG. 8 is a drawing of an RF transmitter including a conventional hole blowing apparatus.
Figure 9:
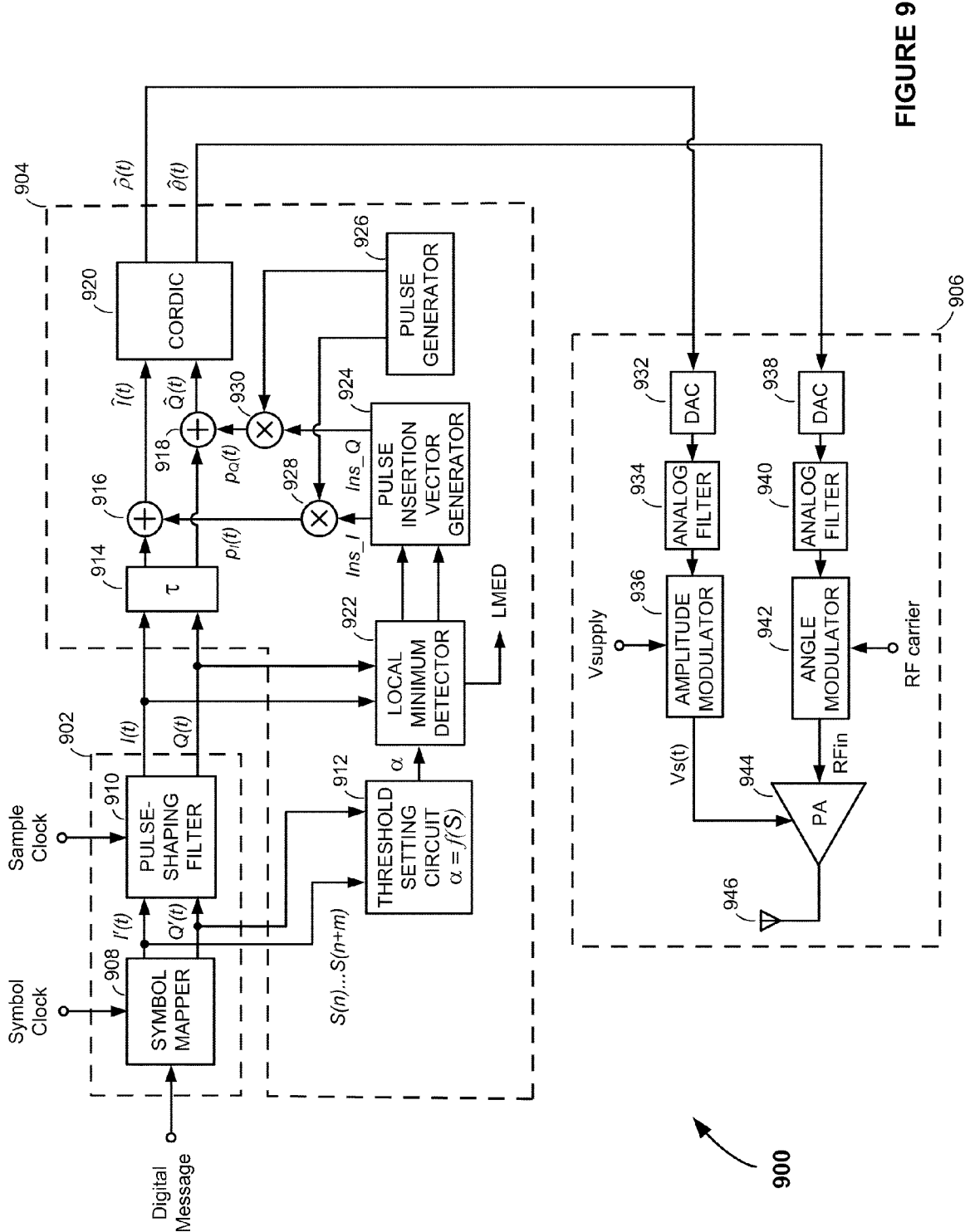
FIG. 9 is a drawing of a polar transmitter that includes an average-to-minimum magnitude ratio (AMR) reduction circuit configured to perform an adaptive hole blowing process, according to an embodiment of the present invention.

Referring to FIG. 9, there is shown a polar transmitter 900, according to an embodiment of the present invention. The polar transmitter 900 may be used in a variety of different applications, including in an access point or basestation, or in a mobile handset, such as is used in a mobile telecommunications network, for example. The polar transmitter 900 comprises a baseband modulator 902, an average-to-minimum magnitude ratio (AMR) reduction circuit 904, and a polar modulator 906. The baseband modulator 902 and AMR reduction circuit 904 are implemented as a digital signal processor (DSP) comprised of hardware or a combination of hardware and software, such as a microprocessor, microcontroller, field-programmable gate array, or other programmable or nonprogrammable integrated circuit, and are formed in one or more digital integrated circuits, as will be appreciated by those of ordinary skill in the art.

The baseband modulator 902 includes a symbol mapper 908 and a pulse-shaping filter 910. The symbol mapper 908 is configured to generate a sequence of symbols comprised of in-phase and quadrature-phase components I'(t) and Q'(t) from a binary-source data stream containing a digital message to be transmitted. The polar transmitter 900 comprises either a single-mode polar transmitter or a multi-mode transmitter. Accordingly, the symbol mapper 908 is configured to operate according to either a single modulation scheme or in accordance with multiple modulation schemes. According to one embodiment, the symbol mapper 902 is configured to format the sequence of symbols according to the Hybrid Phase Shift Keying (HPSK) modulation scheme specified by the Third Generation Partnership Project (3GPP) for use in the Wideband Code Division Multiple Access (W-CDMA) air interface of Universal Mobile Telecommunications System (UMTS) networks and according to the Quadrature Phase Shift Keying (QPSK) and 16 Quadrature Amplitude Modulation (16QAM) modulation schemes specified by the 3GPP for use in UMTS networks supporting the High-Speed Packet Access (HSPA) communication protocols.

The pulse-shaping filter 910, which in one embodiment comprises a root-raised-cosine filter, is configured to pulse shape the I'(t) and Q'(t) components of the sequence of symbols from the symbol mapper 908 and then sample the result, to provide digital samples of a complex baseband signal s(t) having in-phase and quadrature-phase components Q(t) and I(t).

The AMR reduction circuit 904 comprises a threshold setting circuit 912, a main signal path that includes a delay element 914, I and Q summers 916 and 918, and Coordinate Rotation Digital Computer (CORDIC) converter 920; and a feed-forward path that includes a local minimum detector 922, pulse insertion vector generator 924, pulse generator 926, and I and Q multipliers 928 and 930.

The threshold setting circuit 912 is configured to generate a low-magnitude threshold α that adapts to (or is a function of) the symbols generated by the symbol mapper 908. The local minimum detector 922 is configured to receive the low-magnitude threshold α and compare samples of the digital baseband signal components I(t) and Q(t) to the low-magnitude threshold α. If the local minimum detector 922 detects a low-magnitude event, i.e., detects that the magnitude $(I^2+Q^2)^{1/2}$ of a given sample of the baseband signal s(t) is less than the low-magnitude threshold α, it generates a local minimum event detected (LMED) signal, and the pulse insertion vector generator 924 generates a pulse insertion vector (Ins_I, Ins_Q).

The pulse insertion vector (Ins_I, Ins_Q) is, in general, complex, having a magnitude and phase that affect how the amplitude and/or angle of the baseband signal s(t) is/are to be modified to remove the low-magnitude event. The baseband signal s(t) is modified by a scaled insertion pulse $(p_I(t), p_Q(t))$, which is generated by scaling a pulse (using the I and Q multipliers 928 and 930) provided by the pulse generator 926 by the pulse insertion vector (Ins_I, Ins_Q). The scaled insertion pulse $(p_I(t), p_Q(t))$ is combined with the I(t) and Q(t) components of the baseband signal in the main signal path of the AMR reduction circuit 904 via the I and Q summers 916 and 918. The delay element 914 is set so that the scaled insertion pulse $(p_I(t), p_Q(t))$ is properly combined with the baseband signal s(t) in the temporal vicinity of the detected low-magnitude event.

According to one embodiment of the invention, the threshold setting circuit 912 is configured to generate a low-magnitude threshold α that varies with time and is a function of the magnitudes of the symbols generated by the symbol mapper 908. In other words, $\alpha=f(S)$.

Figure 10:
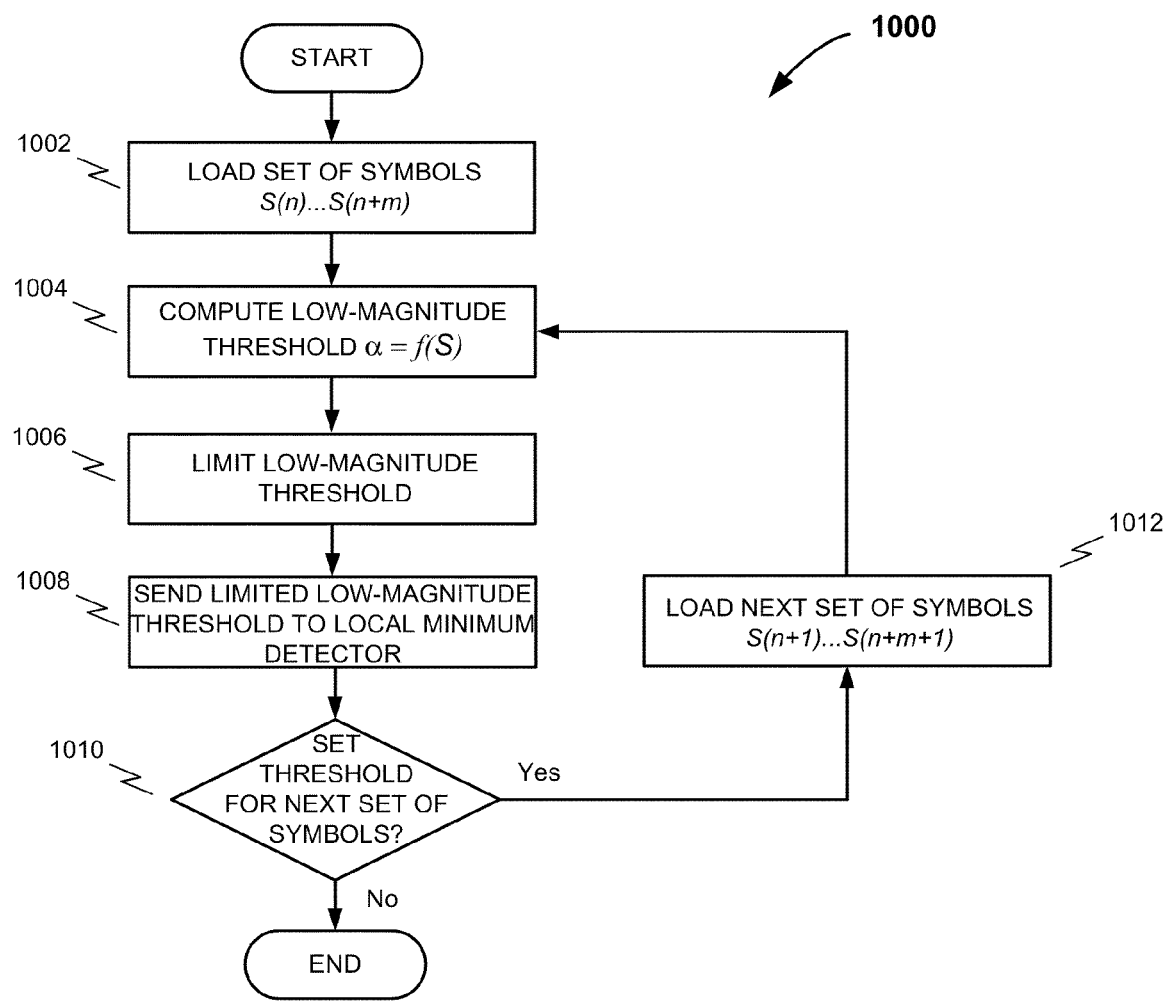
FIG. 10 is a flowchart of a method performed by the threshold setting circuit of the AMR reduction circuit of the polar transmitter in FIG. 9 to generate a low-magnitude threshold α that varies over time and adapts to (i.e., is a function of) the symbols generated by the baseband modulator of the polar transmitter.

An exemplary method 1000 of setting the low-magnitude threshold α according to this embodiment of the invention is shown in FIG. 10. In a first step 1002 of the method 1000, a first set of symbols S(n), . . . , S(n+m), where m≧0, is loaded into the threshold setting circuit 912. Next, at step 1004 the low-magnitude threshold α is computed according to a predefined function $f(S)$ and as a function of the magnitude (or magnitudes) of one or more of the symbols in the first set of symbols S(n), . . . , S(n+m). The magnitude (or magnitudes) of the one or more symbols can be based on the minimum, maximum or an average of the magnitudes of one or more symbols in the first set of symbols S(n), . . . , S(n+m).

At step 1006 the threshold is limited to minimum (min) and maximum (max) values. Then, at step 1008 the value of the min/max limited low-magnitude threshold α is sent to the local minimum detector 922, which, as described above, operates to compare the magnitudes of samples of the digital baseband signal s(t) to the low-magnitude threshold α.

The local minimum detector 922 continues comparing the magnitudes of the samples of the digital baseband signal s(t) to the low-magnitude threshold α until at decision 1010 it is determined that a new low-magnitude threshold α is to be calculated and used. When this condition occurs, the next set of symbols S(n+1), . . . , S(n+m+1) is loaded into the threshold setting circuit 912 and steps 1002-1010 are repeated.

It should be mentioned here that, while the threshold setting circuit 912 in this exemplary embodiment is configured to generate the low-magnitude threshold α as a function of the magnitudes of the incoming symbols (i.e., prior to the pulse-shaping filter 910, as in FIG. 9), it can be alternatively configured to generate the low-magnitude threshold α as a function of the magnitudes of samples (or oversamples, if oversampling is used) of the digital baseband signal s(t) produced at the output of the pulse shaping filter 910.

The function $f(S)$ defining the low-magnitude threshold α can be a continuous function (linear or polynomial) or a non-continuous (i.e., nonlinear) function. FIGS. 11A-F show various functions that may be used. When the polar transmitter 900 is configured for multi-mode operation, the same or different functions may be used for the various modulation schemes that the multi-mode polar transmitter is configurable to operate.

Figure 12:
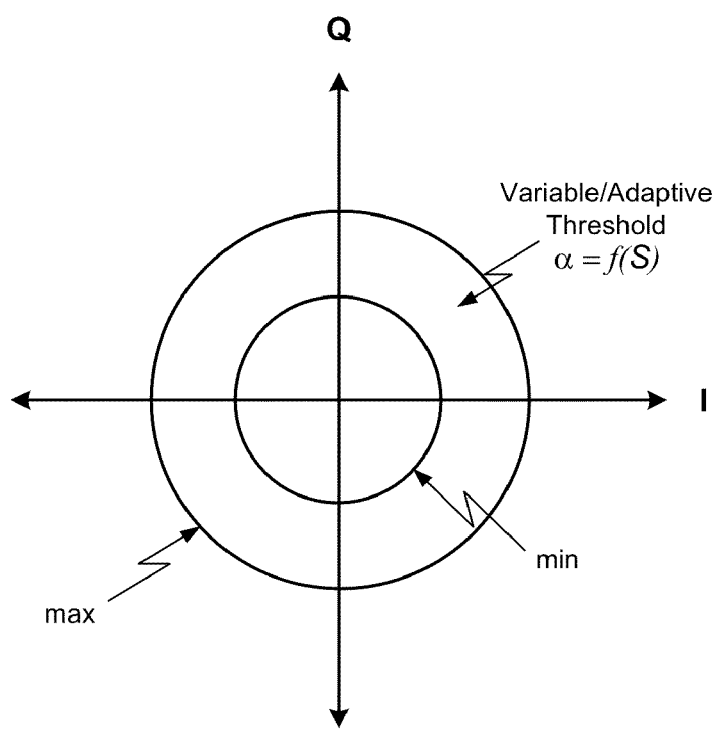
FIG. 12 is a graph in the complex signal plane (i.e., the in-phase (I)/quadrature phase (Q) or "I-Q" plane), illustrating how a hole of radius $\alpha = f(S)$ is formed in the I-Q signal plane and varies continuously between minimum (min) and maximum (max) low-magnitude threshold values for functions $f(S)$ that are continuous.

When plotted in the complex (I-Q) signal plane, the hole that is produced in the signal trajectory has a radius equal to α, and the size (i.e., radius) of the hole varies between the minimum (min) and maximum (max) low-magnitude threshold values. When the selected function $f(S)$ is a linear or polynomial function, the hole size varies continuously between the min and max values, as illustrated in the I-Q signal plane diagram in FIG. 12. When the selected function $f(S)$ is non-linear, like the step function in FIG. 13, a plurality of holes of different sizes are generated, as illustrated in FIG. 14.

The rate at which the hole size varies depends on the rate at which the incoming symbols are examined by the threshold setting circuit 912. In one embodiment of the invention, the rate at which the incoming symbols are examined corresponds to the 3.84 Mchips/sec chip rate used in an UMTS system. However, the rate can be set to other values, including multiples or fractions of the chip rate, or multiples or fractions of the sampling or oversampling rate used in generating the I and Q component samples of the complex baseband signal s(t).

Figure 13:
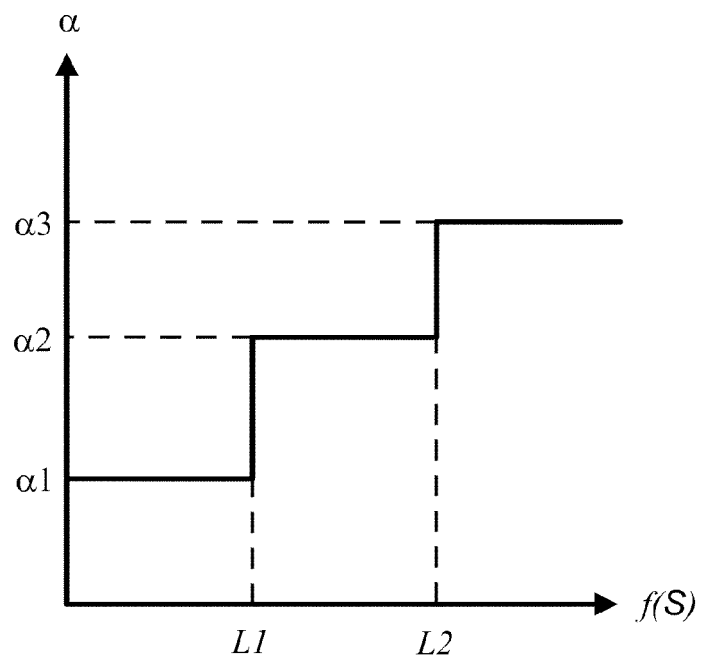
FIG. 13 is graph of a non-linear step function $f(S)$ having three different threshold levels α1, α2 and α3, which are selected from to set the low-magnitude threshold α depending on the magnitude (or magnitudes) of one or more symbols generated by the baseband modulator of the polar transmitter in FIG. 9.
Figure 14:
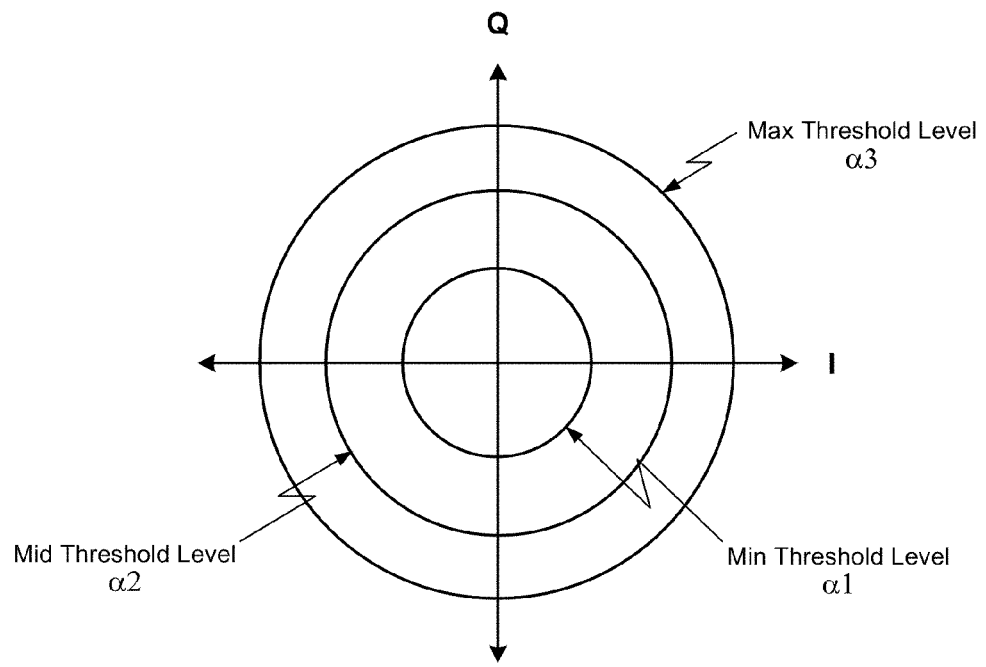
FIG. 14 is a graph in I-Q signal plane, illustrating how three different holes of radiuses α1, α2 and α3 are formed in the I-Q signal plane when the low-magnitude threshold $\alpha = f(S)$ is a three-step step function, like that in FIG. 13.

In one embodiment of the invention, the three-step step function $f(S)$ in FIG. 13 is used, m, which establishes the size of the sets of symbols S(n), . . . , S(n+m), is set equal to one (i.e., m=1) to form sets of symbols with two symbols each, and the threshold setting circuit 912 is configured to set the low-magnitude threshold α to α1, α2 or α3, depending on the magnitude of the lowest-magnitude symbol in each two symbol set.

For each two symbol set that is examined, the threshold setting circuit 912 sets the low-magnitude threshold α to α1, α2 or α3. For a two symbol set in which the magnitude of the lowest-magnitude symbol is less than L1 (refer to FIG. 13), the threshold setting circuit 912 sets α equal to α1. For a two symbol set in which the magnitude of the lowest-magnitude symbol is greater than or equal to L1 but less than L2, the threshold setting circuit 912 sets α equal to α2. And for a two symbol set in which the magnitude of the lowest-magnitude symbol is greater than or equal to L2, the threshold setting circuit 912 sets α equal to α3.

Once the low-magnitude threshold α has been set to α1, α2 or α3, the local minimum detector 922 operates to detect local minimum events in the baseband signal s(t) using that value of α. The same value of α is used until the threshold setting circuit 912 examines symbols in a subsequent two symbol set requiring a change of the low-magnitude threshold α from its present level to a different one of the threshold levels α1, α2 or α3.

The actual values of the lower and upper levels L1 and L2 and the threshold levels α1, α2 and α3 are determined beforehand by test or simulation. In one embodiment, where the symbol mapper 902 is configured to format the sequences of symbols I'(t) and Q'(t) according to both HPSK and High-Speed Uplink Packet Access (HSUPA), the min, mid and max threshold levels a2, a2 and a3 and lower and upper levels L1 and L2 are set so that a desired combination of in-band and out-of-band noise performance characteristics are satisfied for a plurality of different HPSK and HSUPA signals the polar transmitter 900 is configurable to transmit.

Figure 15:
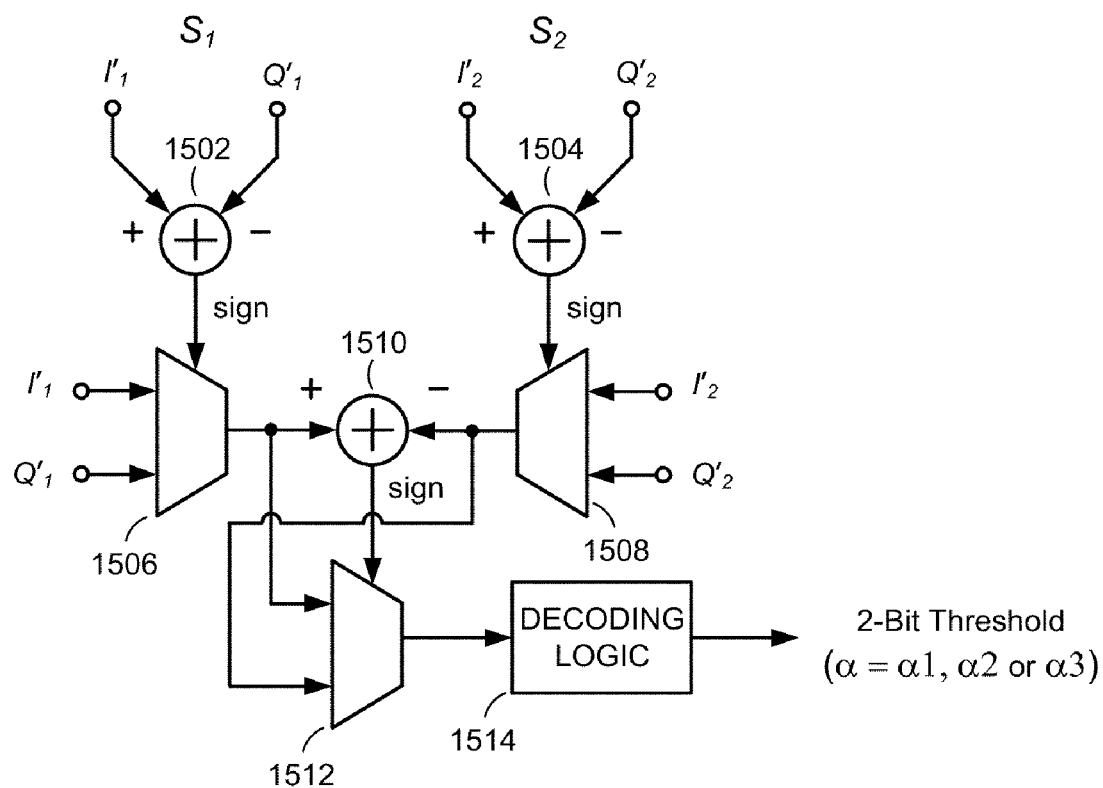
FIG. 15 is a drawing of a threshold setting circuit that may be used to set the low-magnitude threshold $\alpha = f(S)$ in the AMR reduction circuit of the polar transmitter in FIG. 9.

FIG. 15 is a drawing of a threshold setting circuit 1500 that may be used to implement the threshold setting circuit 912 in FIG. 9, when the function $f(S)$ defining the low-magnitude threshold α is a three-step step function $f(S)$, as in FIG. 13. The threshold setting circuit 1500 operates to determine which symbol of two consecutive symbols $S_1=(I'_1, Q'_1)$ and $S_2=(I'_2, Q'_2)$ has the lowest magnitude, and based on the result, sets the low-magnitude threshold a to one of 2-bit threshold levels α1, α2 or α3. More specifically, first and second summers 1502 and 1504 first determine which of the I and Q components in each of the symbols $S_1$ and $S_2$ has the lowest magnitude. The I and Q components are represented in two's complement form with the most significant bit (MSB) operating as a sign bit. Accordingly, the first and second summers 1502 and 1504 operate as comparators, the sign bit at the output of the first summer 1502 indicating which of the I and Q components of the first symbol $S_1$ is of the lowest magnitude and the sign bit at the output of the second summer 1502 indicating which of the I and Q components of the second symbol $S_2$ has the lowest magnitude.

The sign bits at the outputs of the first and second summers 1502 and 1504 are coupled to the select inputs of first and second multiplexers 1506 and 1508, so that the I or Q component of the first symbol $S_1$ having the lowest magnitude is produced at the output of the first multiplexer 1506 and the I or Q component of the second symbol $S_2$ having the lowest magnitude is produced at the output of the second multiplexer 1508. A third summer 1510 and third multiplexer 1512 operate similarly, selecting the lowest-magnitude output from among the two outputs of the first and second multiplexers 1506 and 1508. Finally, depending on magnitude of the output of the third multiplexer 1512, decoding logic 1514 sets the low-magnitude threshold a to the appropriate 2-bit threshold level α1, α2 or α3.

The threshold setting circuit 1500 operates on the basis that the magnitudes of the symbols $S_1$ and $S_2$ are constrained to a limited number of known values (defined by the particular modulation scheme being employed), and the ability to determine the magnitude of the lowest-magnitude symbol by only having to determine the magnitude of the lowest-magnitude I or Q component in the two symbols $S_1$ and $S_2$. The magnitudes of the symbols themselves need not be directly computed, thereby avoiding the need for computationally intensive square root calculations. Nevertheless, other threshold setting circuits that compute the magnitudes of the symbols $S_1$ and $S_2$ (either directly or indirectly) and which set the low-magnitude threshold a based on a comparison of the computed results may be alternatively used.

Figure 16:
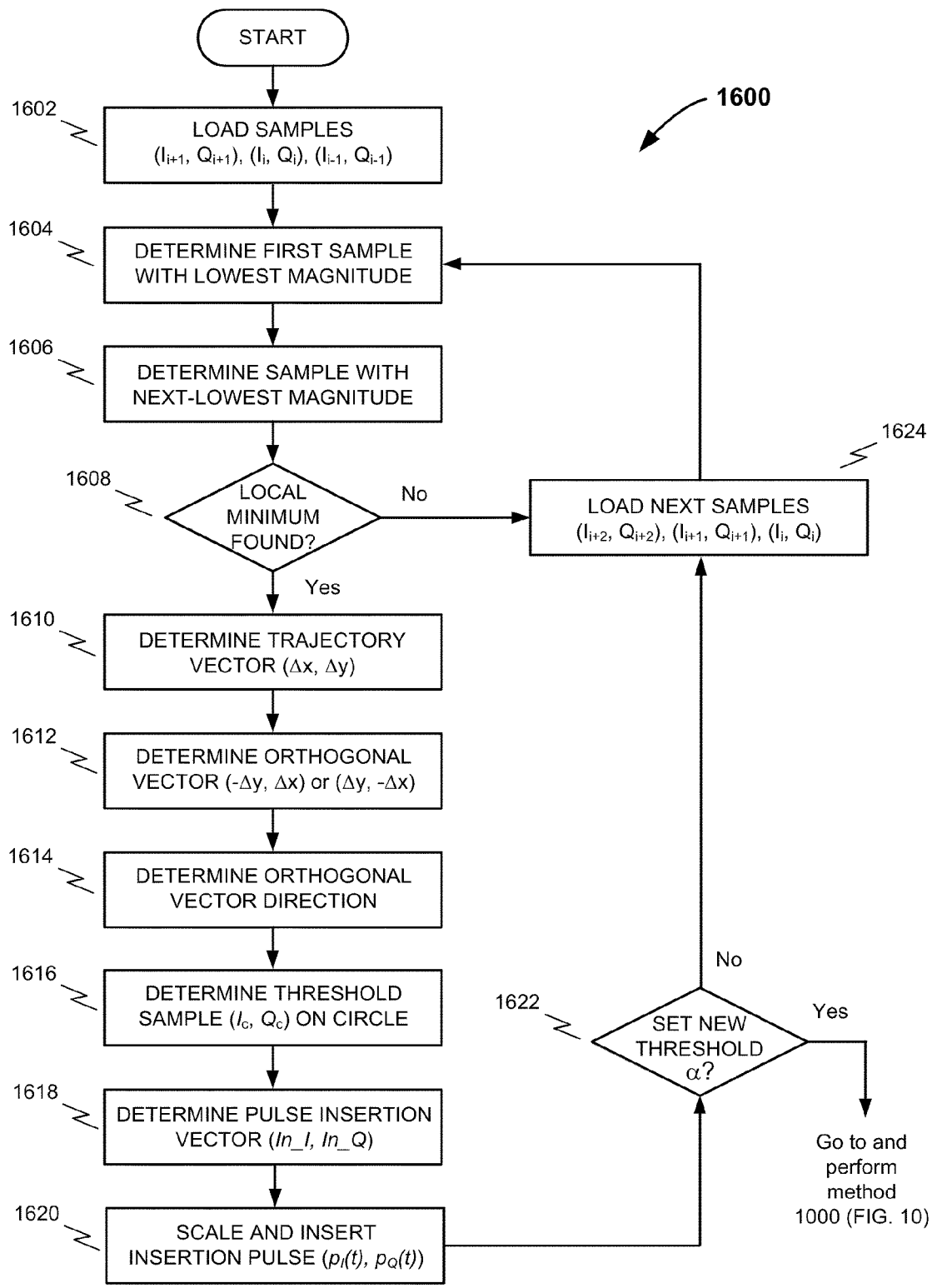
FIG. 16 is a flowchart of an adaptive hole blowing method performed by the AMR reduction circuit of the polar transmitter in FIG. 9, according to an embodiment of the present invention.

FIG. 16 is a flowchart of an adaptive hole blowing method 1600 that incorporates the variable/adaptive low-magnitude threshold aspect of the present invention described above. In a first step 1602 of the method 1600 a first three-sample set of samples $(I_{i+1}, Q_{i+1})$, $(I_i, Q_i)$, $(I_{i-1}, Q_{i-1})$ is loaded into the local minimum event 922, where i is a sample index and $(I_{i+1}, Q_{i+1})$, $(I_i, Q_i)$ and $(I_{i-1}, Q_{i-1})$ are referred to in the description that follows as the next, middle and prior samples, respectively. In one embodiment, the next, middle and prior samples $(I_{i+1}, Q_{i+1})$, $(I_i, Q_i)$, $(I_{i-1}, Q_{i-1})$, and samples in subsequent sample sets, are temporally adjacent (i.e., are consecutive). However, that not need be the case, and in an alternative embodiment are temporally nonadjacent (i.e., are nonconsecutive).

Figure 17:
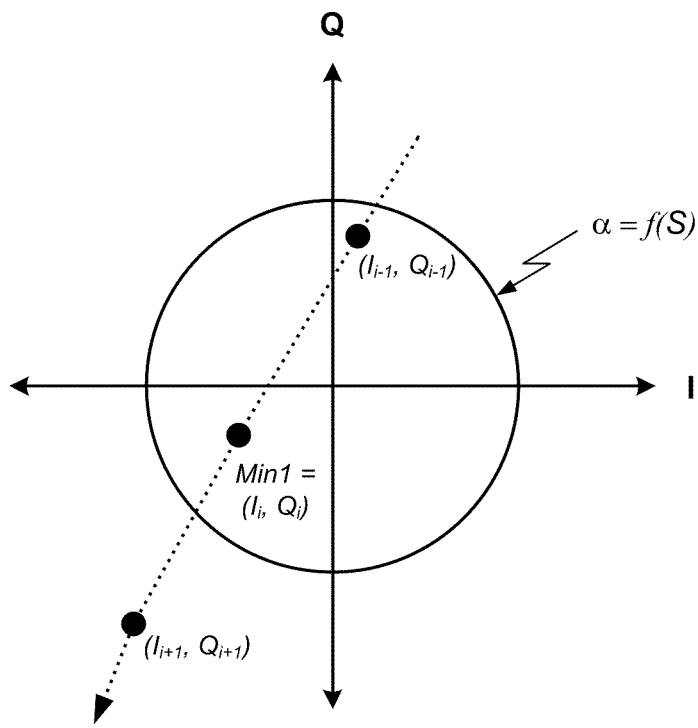
FIG. 17 is a vector diagram in the I-Q signal plane illustrating how the adaptive hole blowing method in FIG. 16 determines which sample among a three-sample set ($I_{i+1}$, $Q_{i+1}$), ($I_i$, $Q_i$), ($I_{i-1}$, $Q_{i-1}$) has the lowest magnitude.
Figure 18:
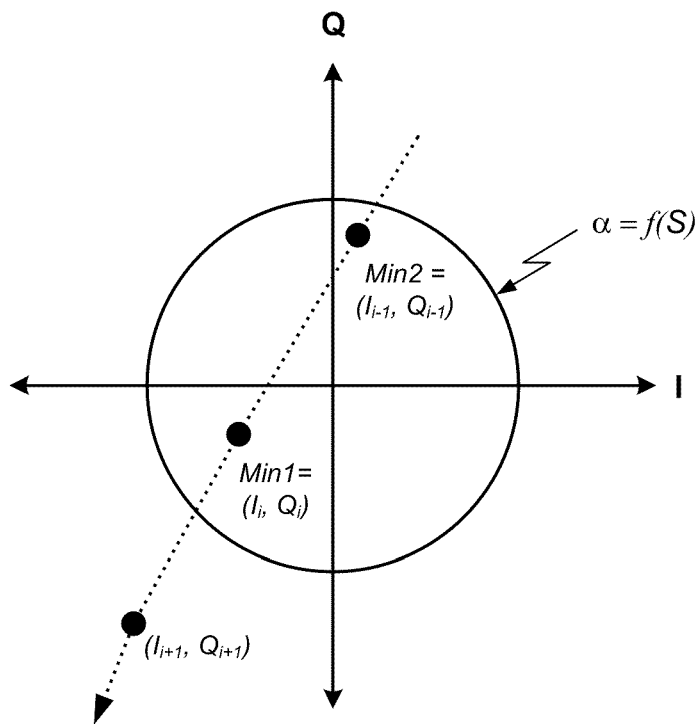
FIG. 18 is a vector diagram in the I-Q signal plane illustrating how the adaptive hole blowing method in FIG. 16 determines which sample among the three-sample set ($I_{i+1}$, $Q_{i+1}$), ($I_i$, $Q_i$), ($I_{i-1}$, $Q_{i-1}$) has the next-lowest magnitude.

In steps 1604 and 1606 (see FIGS. 17 and 18) the local minimum detector 922 determines which sample among the samples in the first three-sample set $(I_{i+1}, Q_{i+1})$, $(I_i, Q_i)$, $(I_{i-1}, Q_{i-1})$ has the lowest magnitude (step 1604), and which of the samples has the next-lowest magnitude (step 1606).

Next, at decision 1608, the local minimum detector 922 determines whether a local minimum event is present in the first three-sample set $(I_{i+1}, Q_{i+1})$, $(I_i, Q_i)$, $(I_{i-1}, Q_{i-1})$. The process of detecting a local minimum event can be performed in various way. In the exemplary embodiment described here, a local minimum event is deemed present if the middle sample $(I_i, Q_i)$ in the three-sample set $(I_{i+1}, Q_{i+1})$, $(I_i, Q_i)$, $(I_{i-1}, Q_{i-1})$ has a magnitude that is less then the current value of the low-magnitude threshold $\alpha$ and is the sample among the three samples with the lowest magnitude.

If a local minimum event is not detected ("no" at decision 1608), at step 1624 the next three-sample set $(I_{i+2}, Q_{i+1})$, $(I_{i+1}, Q_{i+1})$, $(I_i, Q_i)$ is loaded into the local minimum detector 922 and steps 1604-1608 are repeated. On the other hand, if a local minimum event is detected ("yes" at decision 1608), the local minimum detector 922 generates an LMED (local minimum event detected) output signal, which is used to signal the pulse insertion vector generator 924 to generate a non-zero pulse insertion vector (Ins_I, Ins_Q), as explained in more detail below.

Figure 19B:
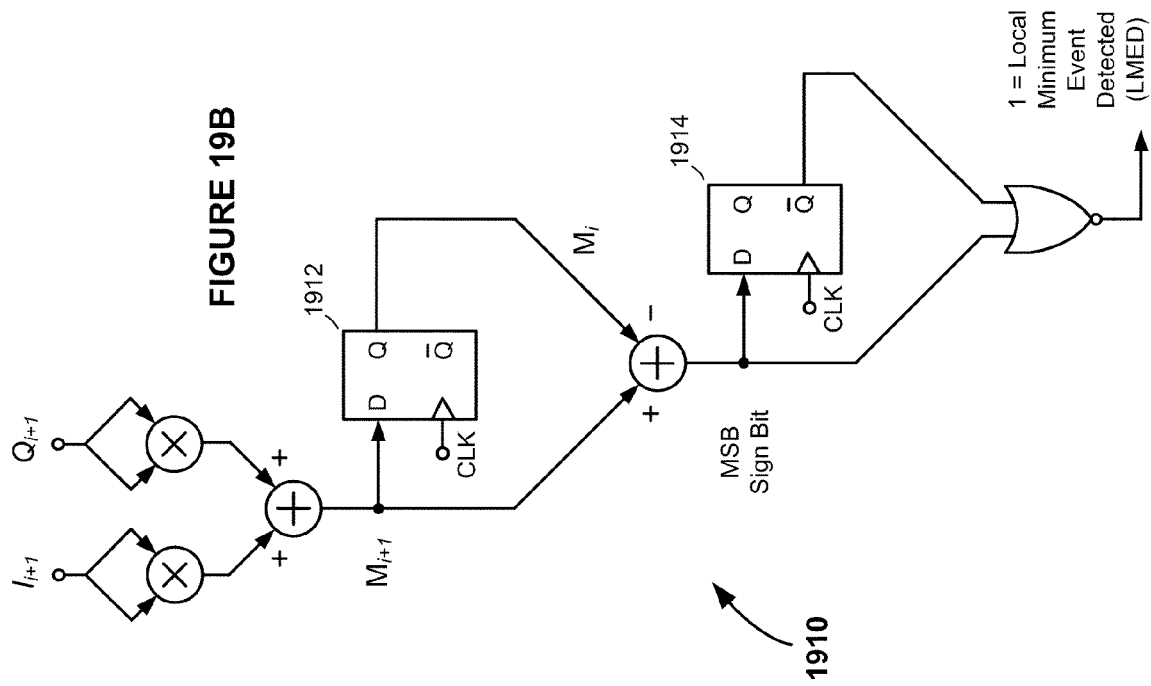
FIG. 19B is a schematic of an alternative local minimum event detection circuit that may be used to detect local minimum events during performance of the adaptive hole blowing method in FIG. 16.
Figure 19A:
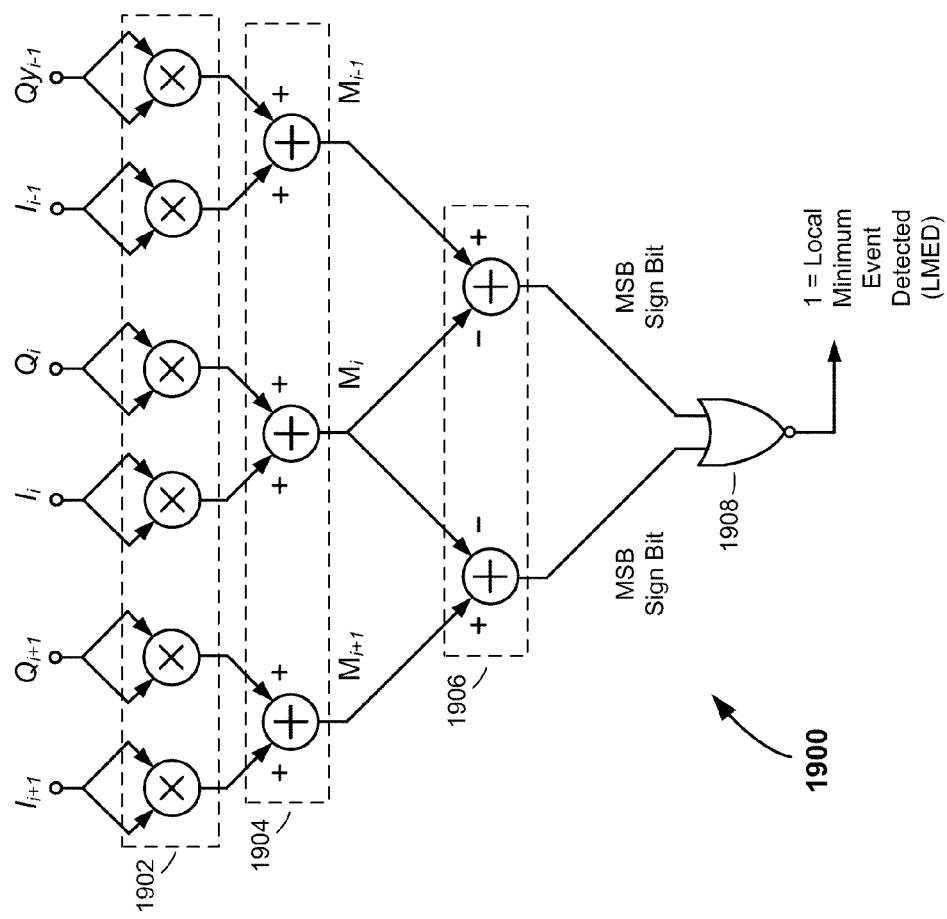
FIG. 19A is a schematic of a local minimum event detection circuit that may be used to detect local minimum events during performance of the adaptive hole blowing method in FIG. 16.

FIG. 19A is a drawing of a local minimum event detection circuit 1900 that may be used to implement the local minimum event detection portion of the local minimum detector 922. The local minimum event detection circuit 1900 comprises a group of multipliers 1902, a first group of adders 1904, a second group of adders 1906, and a NOR logic gate 1908. The multipliers of the group of multipliers 1902 and the adders of the first and second groups of adders 1904 and 1906 may be formed in a variety of different ways. For example, the multipliers may be formed from logic gates using Wallace trees or as Dadda multipliers and the adders may be formed from logic gates using ripple-carry or carry-lookahead adders, as will be appreciated and understood by those of ordinary skill in the art.

The group of multipliers 1902 and the first group of adders 1904 operate to form the sums of the squares of the I and Q components of each sample of the three-sample set $(I_{i+1}, Q_{i+1})$, $(I_i, Q_i)$, $(I_{i-1}, Q_{i-1})$, i.e., $M_{i+1} = [(I_{i+1})^2 + (Q_{i+1})^2]$. $M_i = [(I_i)^2 + (Q_i)^2]$ and $M_{i-1} = [(I_{i-1})^2 + (Q_{i-1})^2]$. Collectively, the sums of the squares $M_{i+1}$, $M_i$ and $M_{i-1}$ provide an accurate indication of the relative magnitudes of the three samples $(I_{i+1}, Q_{i+1})$, $(I_i, Q_i)$, $(I_{i-1}, Q_{i-1})$.

The second group of adders 1906 operates to subtract the square of the magnitude of the middle sample $(I_i, Q_i)$ from the square of the magnitude of the next sample $(I_{i+1}, Q_{i+1})$, and also subtract the square of the magnitude of the middle sample $(I_i, Q_i)$ from the square of the magnitude of the prior sample $(I_{i-1}, Q_{i-1})$. The MSB sign bits at the outputs of the second group of adders 1906 determine whether the magnitude of the middle sample $(I_i, Q_i)$ is the lowest magnitude among the prior, middle and next samples. If it is, the MSB sign bits at the outputs of both adders of the second group of adders 1906 are both at a logic "0" and the LMED output of the NOR logic gate 1908 is a logic "1," indicating the detection of a local minimum event. Otherwise, the LMED output remains at a logic "0."

FIG. 19B is a drawing of an alternative local minimum event detection circuit 1910 that may be used to implement the local minimum event detection portion of the local minimum detector 922. The alternative local minimum event detection circuit 1910 is similar to the local minimum event detection circuit 1900 in FIG. 19A, except that it incorporates delay ("D") flip-flops 1912 and 1914. The D flip-flops 1912 and 1914 provide a pipelining function for the samples, thereby reducing the number of multipliers and adders that are needed to perform the local minimum event detection.

Figure 20:
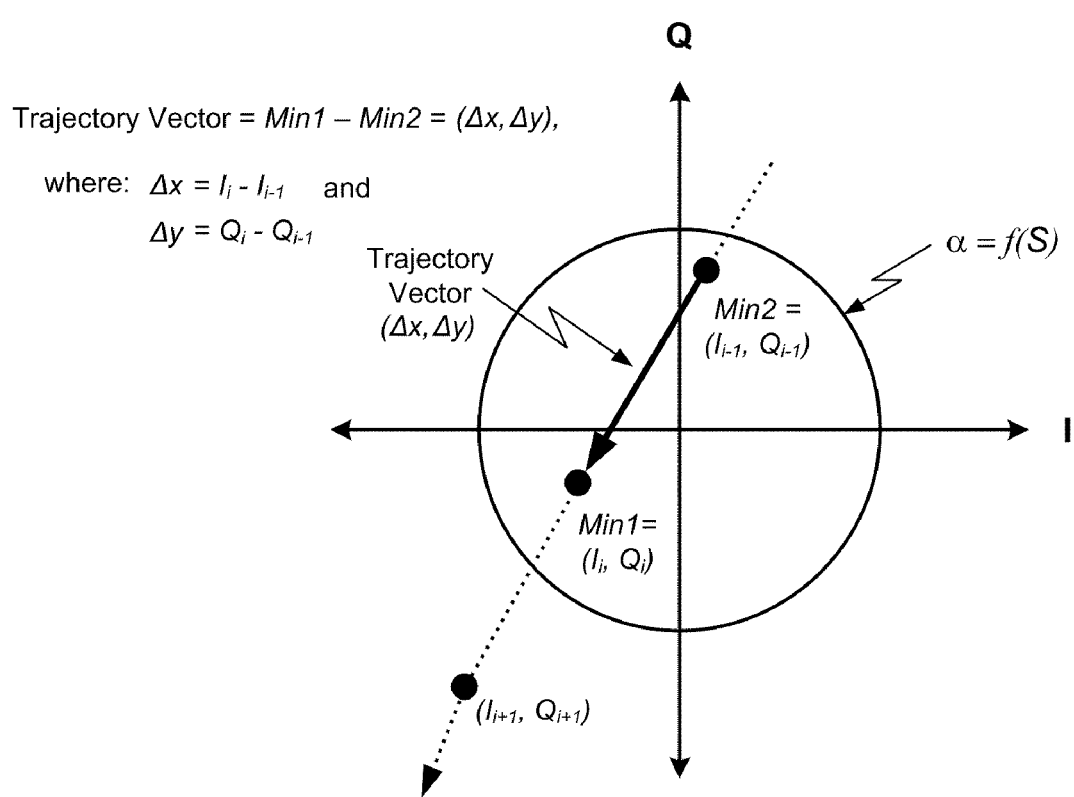
FIG. 20 is a vector diagram in the I-Q signal plane of a trajectory vector (Δx, Δy), which is formed during performance of the adaptive hole blowing method in FIG. 16.

If the local minimum detector 922 has detected the occurrence of a local minimum event at decision 1608 of the method 1600, at step 1610 a trajectory vector $(\Delta x, \Delta y)$ approximating the trajectory of the baseband signal s(t) through the three samples $(I_{i+1}, Q_{i+1})$, $(I_i, Q_i)$, $(I_{i-1}, Q_{i-1})$ is calculated. According to one embodiment, illustrated in FIG. 20, the trajectory vector $(\Delta x, \Delta y)$ is defined as the vector $(Min1-Min 2) = [(I_i - I_{i-1}), (Q_i - Q_{i-1})] = (\Delta x, \Delta y)$ between the lowest-magnitude sample $(I_{i-1}, Q_{i-1})$ and the next-lowest-magnitude sample (in this example, the prior sample $(I_{i-1}, Q_{i-1})$ is the next-lowest-magnitude sample). In an alternative embodiment, the trajectory vector $(\Delta x, \Delta y)$ is defined as the vector between the prior and next samples, i.e., $(\Delta x, \Delta y) = [(I_{i+1} - I_{i-1}), (Q_{i+1} - Q_{i-1})]$.

Figure 21B:
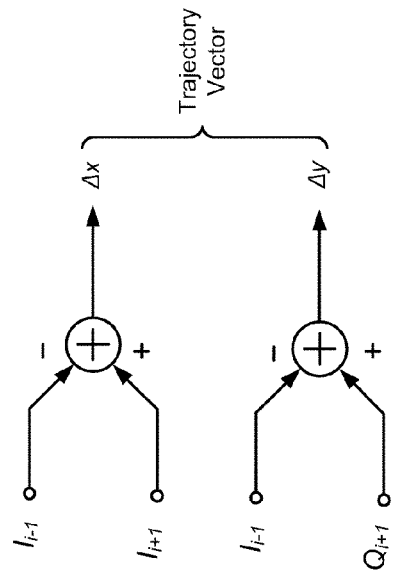
FIG. 21B is a schematic of an alternative trajectory vector calculation circuit that may be used to generate the trajectory vector (Δx, Δy) shown in FIG. 20 during performance of the adaptive hole blowing method in FIG. 16.
Figure 21A:
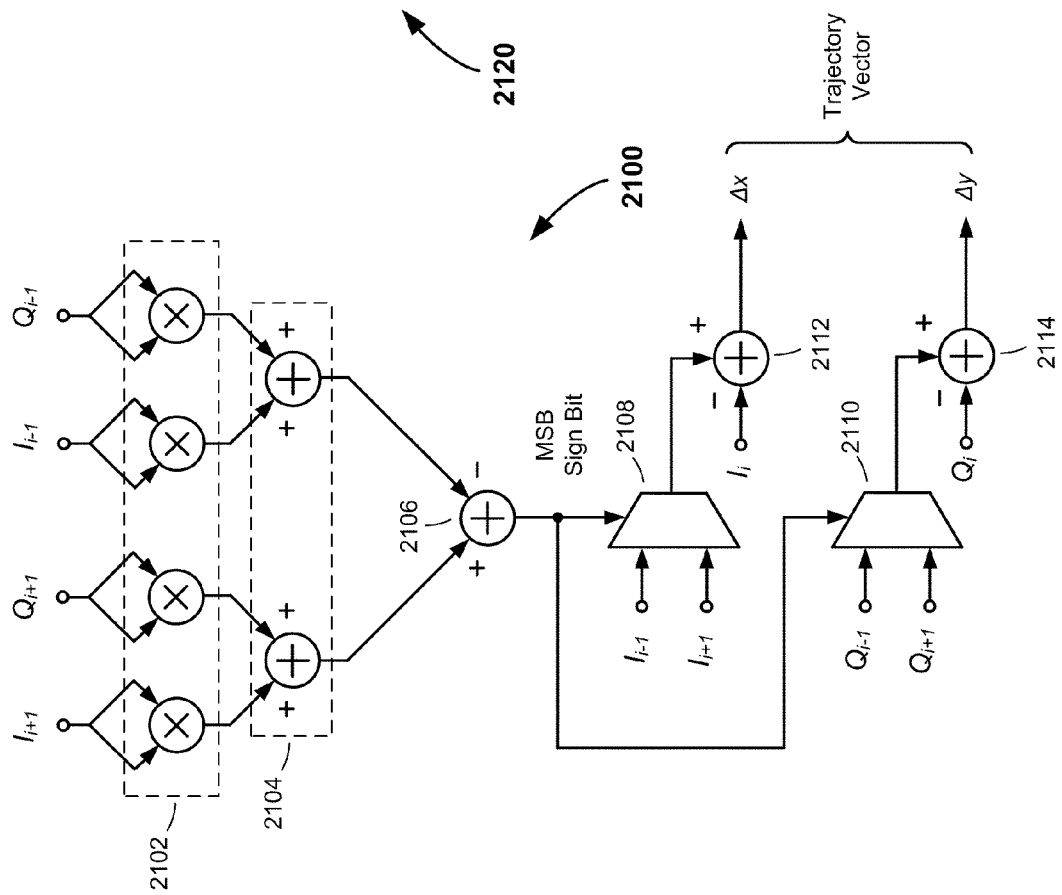
FIG. 21A is a schematic of a trajectory vector calculation circuit that may be used to generate the trajectory vector (Δx, Δy) shown in FIG. 20 during performance of the adaptive hole blowing method in FIG. 16.

FIG. 21A is a drawing of a trajectory vector calculation circuit 2100 that may be used to compute the trajectory vector $(\Delta x, \Delta y)$ in step 1610 of the adaptive hole blowing method 1600. The trajectory vector calculation circuit 2100 comprises a group of multipliers 2102, a group of adders 2104, an MSB sign bit adder 2106, first and second multiplexers 2108 and 2110, and first and second output adders 2112 and 2114. The group of multipliers 2102 and group of adders 2104 operate to determine the squares of the magnitudes of the prior and next samples $(I_{i-1}, Q_{i-1})$ and $(I_{i+1}, Q_{i+1})$. The MSB sign bit adder 2106 subtracts the square of the magnitude of the next sample $(I_{i+1}, Q_{i+1})$ from the square of the magnitude of the prior sample $(I_{i-1}, Q_{i-1})$. The MSB sign bit at the output of the MSB sign bit adder 2106 provides an indication of which of the prior and next samples $(I_{i-1}, Q_{i-1})$ and $(I_{i+1}, Q_{i+1})$ has the lowest magnitude. The one that has the lowest magnitude is the sample that has the next-lowest magnitude among the samples of the three-sample set $(I_{i+1}, Q_{i+1})$, $(I_i, Q_i)$, $(I_{i-1}, Q_{i-1})$.

The MSB sign bit formed at the output of MSB sign bit adder 2106 is directed to the select inputs of the first and second multiplexers 2108 and 2110. Accordingly, if the MSB sign bit has a value indicating that the next sample $(I_{i+1}, Q_{i+1})$ is the next-lowest-magnitude sample among the three-sample set $(I_{i+1}, Q_{i+1})$, $(I_i, Q_i)$, $(I_{i-1}, Q_{i-1})$, the I and Q components of the next sample $(I_{i+1}, Q_{i+1})$ are passed to the outputs of the first and second multiplexers 2108 and 2110. Otherwise, the I and Q components of the prior sample $(I_{i-1}, Q_{i-1})$ are passed to the multiplexer outputs.

Finally, the first and second output adders 2112 and 2114 subtract the I and Q components of the middle sample $(I_i, Q_i)$ from the outputs of the first and second multiplexer 2108 and 2110 to produce the trajectory vector $(\Delta x, \Delta y)$.

As explained above, in an alternative embodiment, the trajectory vector $(\Delta x, \Delta y)$ is defined by the vector difference between the next and prior samples, i.e., $(\Delta x, \Delta y) = [(I_{i+1} - I_{i-1}), (Q_{i+1} - Q_{i-1})]$. FIG. 21B is a trajectory vector calculation circuit 2120 that may be used to generate the trajectory vector $(\Delta x, \Delta y)$ according to that alternative embodiment.

Figure 22:
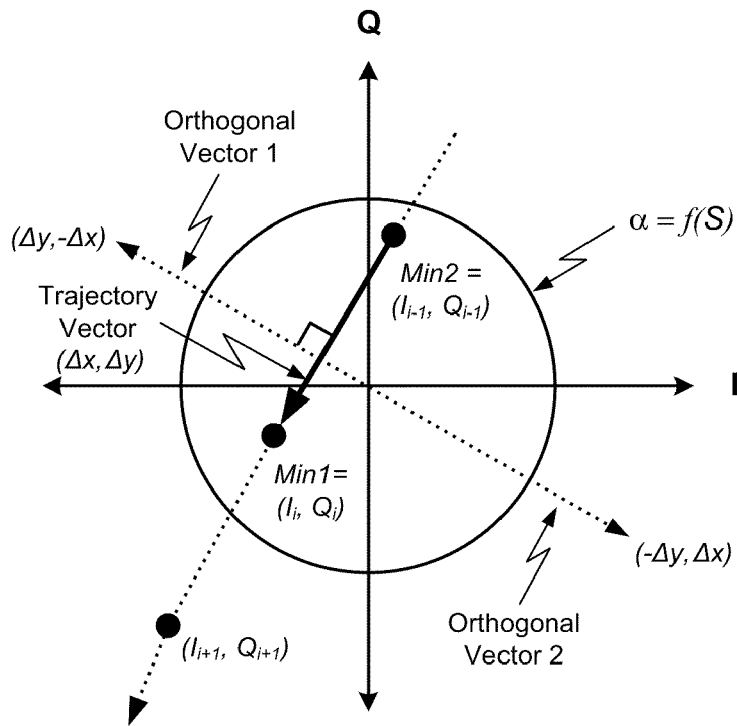
FIG. 22 is a vector diagram in the I-Q signal plane of a first orthogonal vector (Δy, -Δx) and an opposing second orthogonal vector (-Δy, Δx), which are formed during performance of the adaptive hole blowing method in FIG. 16.

At step 1612 the orthogonal vector (i.e., the vector that is orthogonal to the trajectory vector) is determined. There are two possible orthogonal vectors, a first orthogonal vector $(\Delta y, -\Delta x)$ and an opposing second orthogonal vector $(-\Delta y, \Delta x)$, as illustrated in FIG. 22. To ensure proper AMR reduction, it is necessary to select the orthogonal vector having the appropriate direction. The orthogonal vector that has the appropriate direction is the one that facilitates pushing the signal trajectory of the baseband signal s(t) away from the origin, rather than toward it. This selection process, which is performed in step 1614, can be performed in a variety of different ways. An exemplary orthogonal direction selection algorithm is described below.

(1) Solve for (x', y') orthogonal direction from intersection of trajectory and orthogonal vectors (see FIGS. 22 and 23):

| | |
|---|---|
| i. by − ax = c | basic formula |
| ii. $Q_i \Delta x - I_i \Delta y = c$ | equation for trajectory vector through $(I_i, Q_i)$ |
| iii. $y'\Delta x - x'\Delta y = c$ | equation for trajectory vector through (x', y') |
| iv. $Q_i \Delta x - I_i \Delta y = y'\Delta x - x'\Delta y$ | substitute for constant c |
| v. $y' = x'\Delta x/\Delta y$ | equation for orthogonal vector through (x', y') |

-continued (1) Solve for (x', y') orthogonal direction from intersection of trajectory and orthogonal vectors (see FIGS. 22 and 23):

| | |
|---|---|
| vi. $Q_i \Delta x - I_i \Delta y = (x' \Delta x / \Delta y) \Delta x - x' \Delta y$ | substitute for y' in equation vi and solve for x' |
| vii. $-\Delta y Q_i \Delta x - I_i \Delta y) = (\Delta x^2 + \Delta y^2) x'$ | $(\Delta x^2 + \Delta y^2)$ is positive and can be dropped |
| viii. $-\Delta y Q_i \Delta x - I_i \Delta y) = x'$ | |
| ix. $Q_i \Delta x - I_i \Delta y = y' \Delta x - (y' \Delta y / \Delta x) \Delta y$ | substitute for x' in equation vi and solve for y' |
| x. $\Delta x (Q_i \Delta x - I_i \Delta y) = (\Delta x^2 + \Delta y^2) y'$ | $(\Delta x^2 + \Delta y^2)$ is positive and can be dropped |
| xi. $\Delta x (Q_i \Delta x - I_i \Delta y) = y'$ | |

(2) Sign of (x', y') used to find appropriate direction of orthogonal vector.

Figure 23:
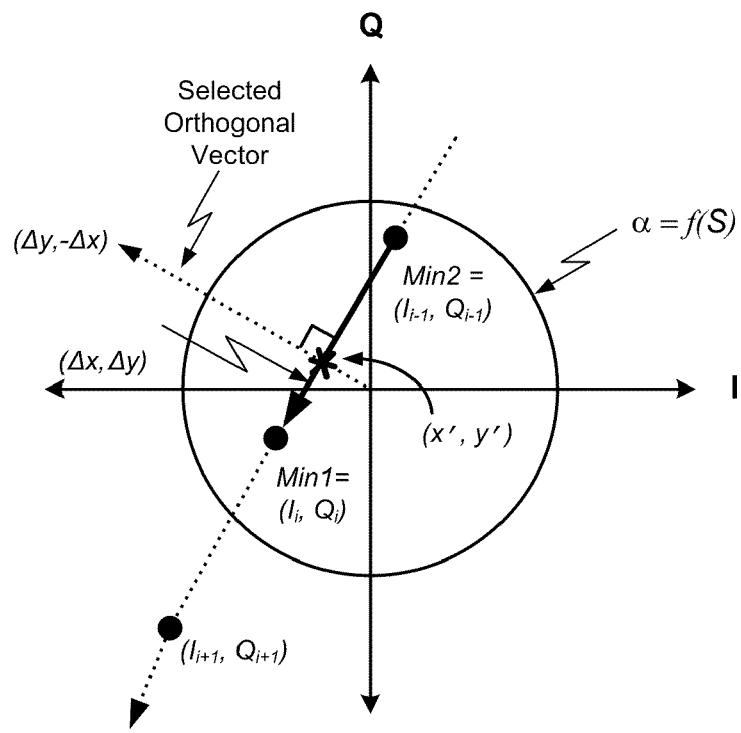
FIG. 23 is a vector diagram in the I-Q signal plane illustrating how the appropriate one of the first and second orthogonal vectors (Δy, -Δx) and (-Δy, Δx) in FIG. 22 is selected during performance of the adaptive hole blowing method in FIG. 16.
Figure 24:
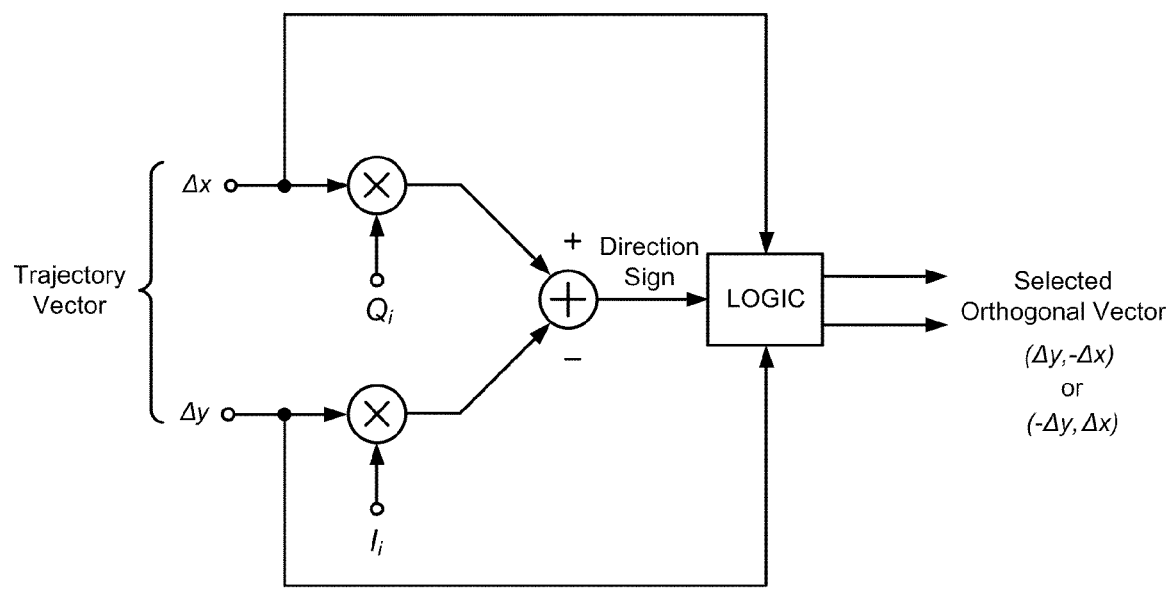
FIG. 24 is a schematic of a circuit that may be used to select the appropriate one of the first and second orthogonal vectors (Δy, -Δx) and (-Δy, Δx) shown in FIG. 22 during performance of the adaptive hole blowing method in FIG. 16.
Figure 25:
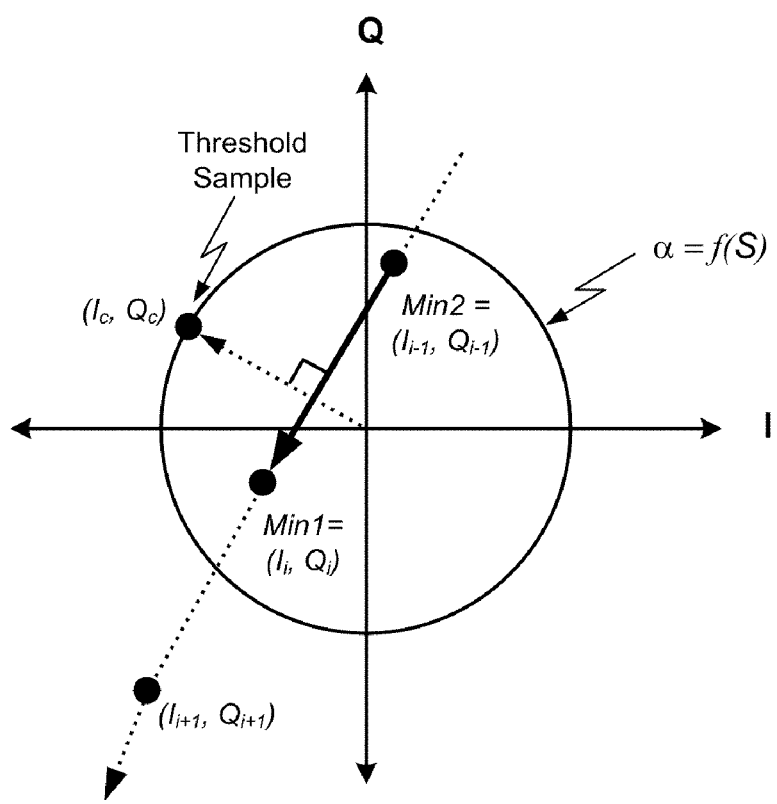
FIG. 25 is a vector diagram in the I-Q signal plane illustrating the location of a threshold sample ($I_c$, $Q_c$) on the low-magnitude threshold circle $\alpha = f(S)$ during performance of the adaptive hole blowing method in FIG. 16.
Figure 26:
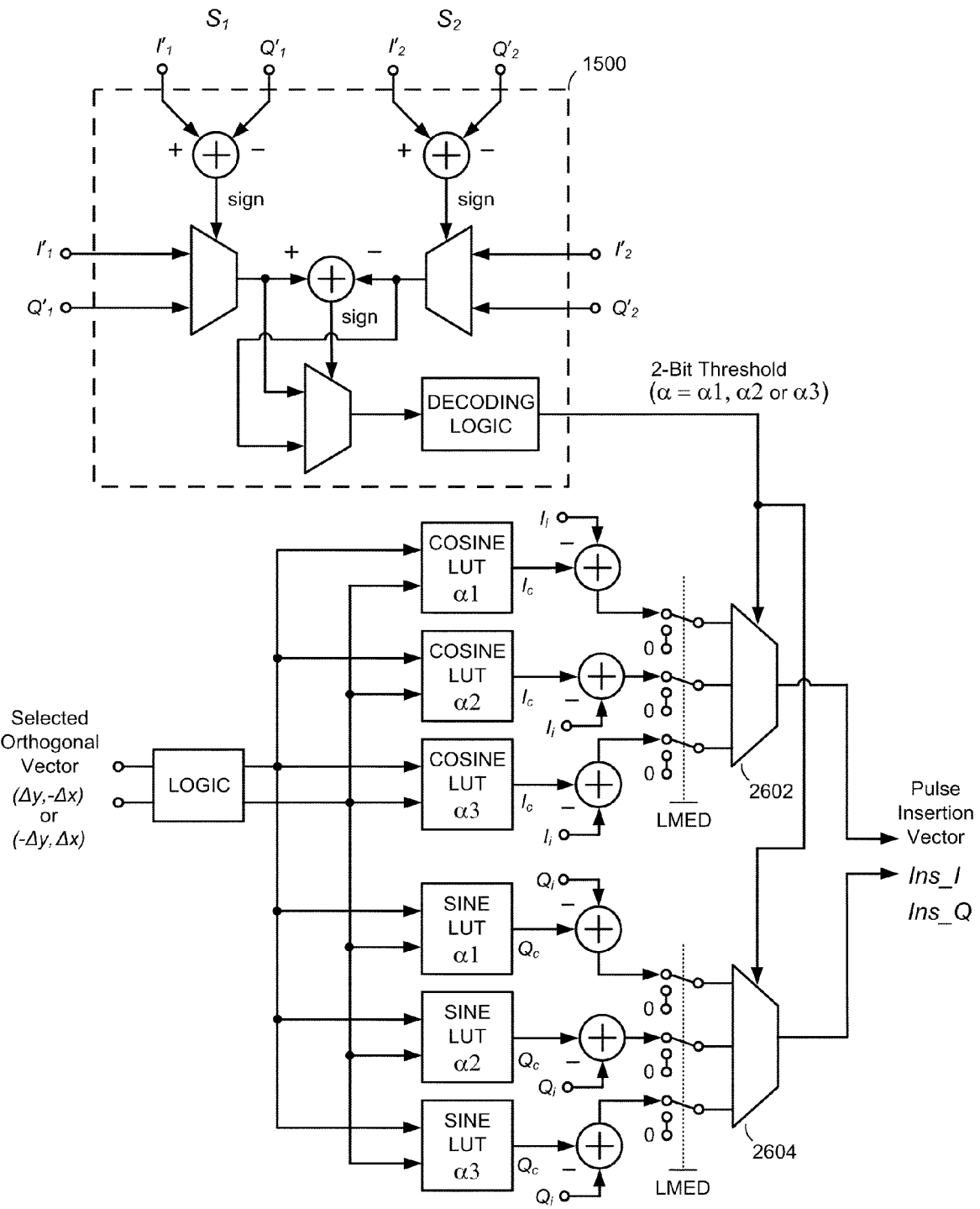
FIG. 26 is a schematic of a pulse insertion vector generator circuit that may be used to form a pulse insertion vector (Ins_I, Ins_Q) during performance of the adaptive hole blowing method in FIG. 16.

In the example shown and described here, the first orthogonal vector $(\Delta y, -\Delta x)$ is determined and selected to be the appropriate orthogonal vector. The selected orthogonal vector $(\Delta y, -\Delta x)$ and its direction are shown in FIG. 23. After the appropriate orthogonal vector direction is determined at step 1614, at step 1616 the coordinates of the selected orthogonal vector are used as a reference into a lookup table (LUT) to retrieve a threshold sample $(I_c, Q_c)$ that intersects with the low-magnitude threshold circle α and the selected orthogonal vector $(\Delta y, -\Delta x)$, as illustrated in FIG. 24. Because the low-magnitude threshold α is a function of the incoming symbols, i.e., $\alpha = f(S)$, the threshold sample $(I_c, Q_c)$ varies depending on the current value of the low-magnitude threshold a provided by the threshold setting circuit 912. In the exemplary described above, where $f(S)$ is a three-step step function (see FIGS. 13 and 14 and accompanying description) three separate pairs of sine and cosine LUTs are used, as illustrated in FIG. 26, each LUT corresponding to one of the three different possible threshold levels α1, α2 and α3. Which pair of LUTs is used depends on which of the three threshold levels α1, α2 and α3 the low-magnitude threshold α is set to (as provided by the threshold setting circuit 1500).

Figure 27:
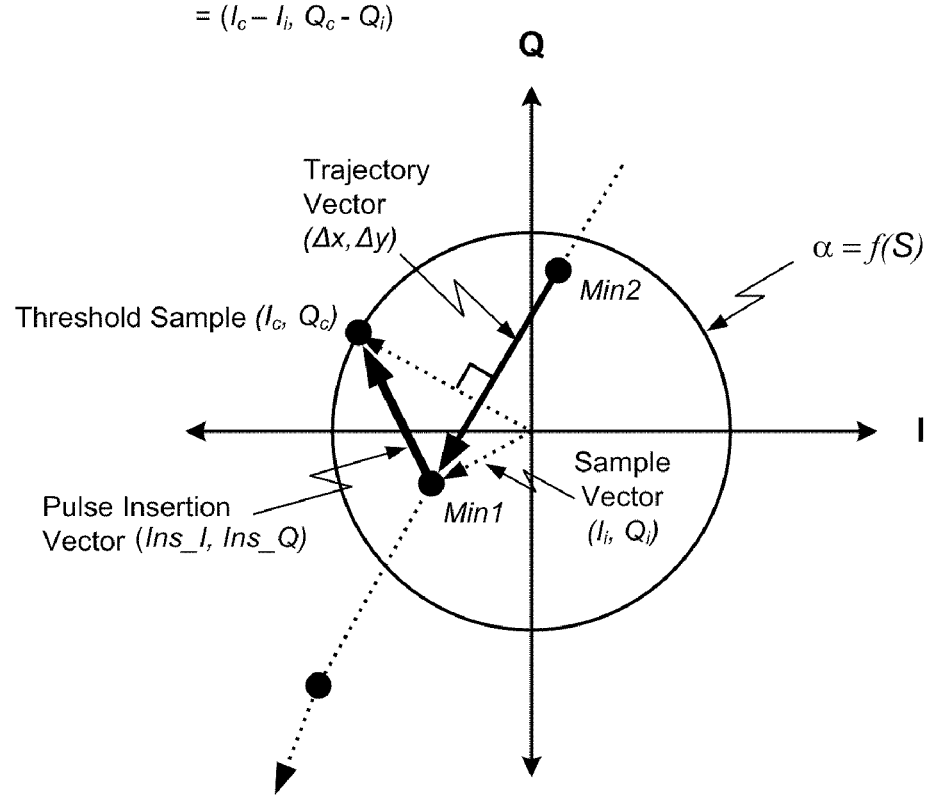
FIG. 27 is a vector diagram in the I-Q signal plane of the pulse insertion vector (Ins_I, Ins_Q) generated by the pulse insertion vector generator circuit in FIG. 26, and the relationship of the pulse insertion vector (Ins_I, Ins_Q) to the trajectory vector (Δx, Δy) and the sample vector ($I_i$, $Q_i$)

At step 1618 the I and Q components of the lowest-magnitude middle sample $(I_i, Q_i)$ are subtracted from the I and Q components of the threshold sample $(I_c, Q_c)$ to determine three different pulse insertion vectors (Ins_I, Ins_Q), each corresponding to one of the three different threshold levels α1, α2 and α3. As shown in FIG. 26, the appropriate threshold-dependent pulse insertion vector (Ins_I, Ins_Q) is selected at the outputs of first and second pulse insertion vector multiplexers 2602 and 2604 using the current value of the low-magnitude threshold α as the select input for each of the multiplexers 2602 and 2604. Note that if a low-magnitude event was not previously detected by the local minimum detector 922, the LMED signal has αvalue that switches the inputs to the first and second pulse insertion vector multiplexers 2602 and 2604 to zero, effectively providing a pulse insertion vector (Ins_I, Ins_Q) of zero value to the multiplexer outputs. The pulse insertion vector (Ins_I, Ins_Q) and its relationship to the trajectory vector $(\Delta x, \Delta y)$ and the sample vector $(I_i, Q_i)$ are shown in FIG. 27.

Once the pulse insertion vector (Ins_I, Ins_Q) has been determined, at step 1620 the I and Q multipliers 928 and 930 scale a complex insertion pulse provided by the pulse generator 926 by the pulse insertion vectors (Ins_I, Ins_Q), to provide the desired, scaled complex insertion pulse $(p_I(t), p_Q(t))$. The impulse response of the pulse generator 926 can be the same as the pulse shaping filter 910 or may be different. In one embodiment, the impulse response of the pulse generator 926 is substantially similar to the impulse response of a root-raised-cosine filter. However, it may have different shapes, e.g., Gaussian, triangular, etc. After the scaled complex insertion pulse $(p_I(t), p_Q(t))$ is generated, it is added to the baseband signal s(t) in the main signal path of the AMR reduction circuit 904 (via the I and Q summers 916 and 918 in FIG. 9) in the temporal vicinity of the lowest-magnitude middle sample $(I_i, Q_i)$, thereby reducing the AMR of the baseband signal s(t).

Finally, at decision 1622 it is determined whether the threshold setting circuit 912 is ready to set the low-magnitude threshold a to a new value. If it is ("yes"), the threshold setting circuit 912 performs threshold setting method 1000 (see FIG. 10) on a next set of symbols before continuing with the adaptive hole blowing method 1600. Once the method 1000 is completed, the adaptive hole blowing method 1600 resumes at step 1624, where the next set of samples $(I_{i+2}, Q_{i+2})$, $(I_{i+1}, Q_{i+1})$, $(I_i, Q_i)$ is loaded for examination by the local minimum detector 922 using the new value of the low-magnitude threshold α. If, on the other hand at decision 1622 it is determined that a new low-magnitude threshold α does not need to be adjusted to a new level, the adaptive hole blowing method 1600 proceeds directly to step 1624 (i.e., without first performing the threshold setting method 1000 in FIG. 10), and the next set of samples $(I_{i+2}, Q_{i+2})$, $(I_{i+1}, Q_{i+1})$, $(I_i, Q_i)$ is loaded for examination by the local minimum detector 922.

Figure 28:
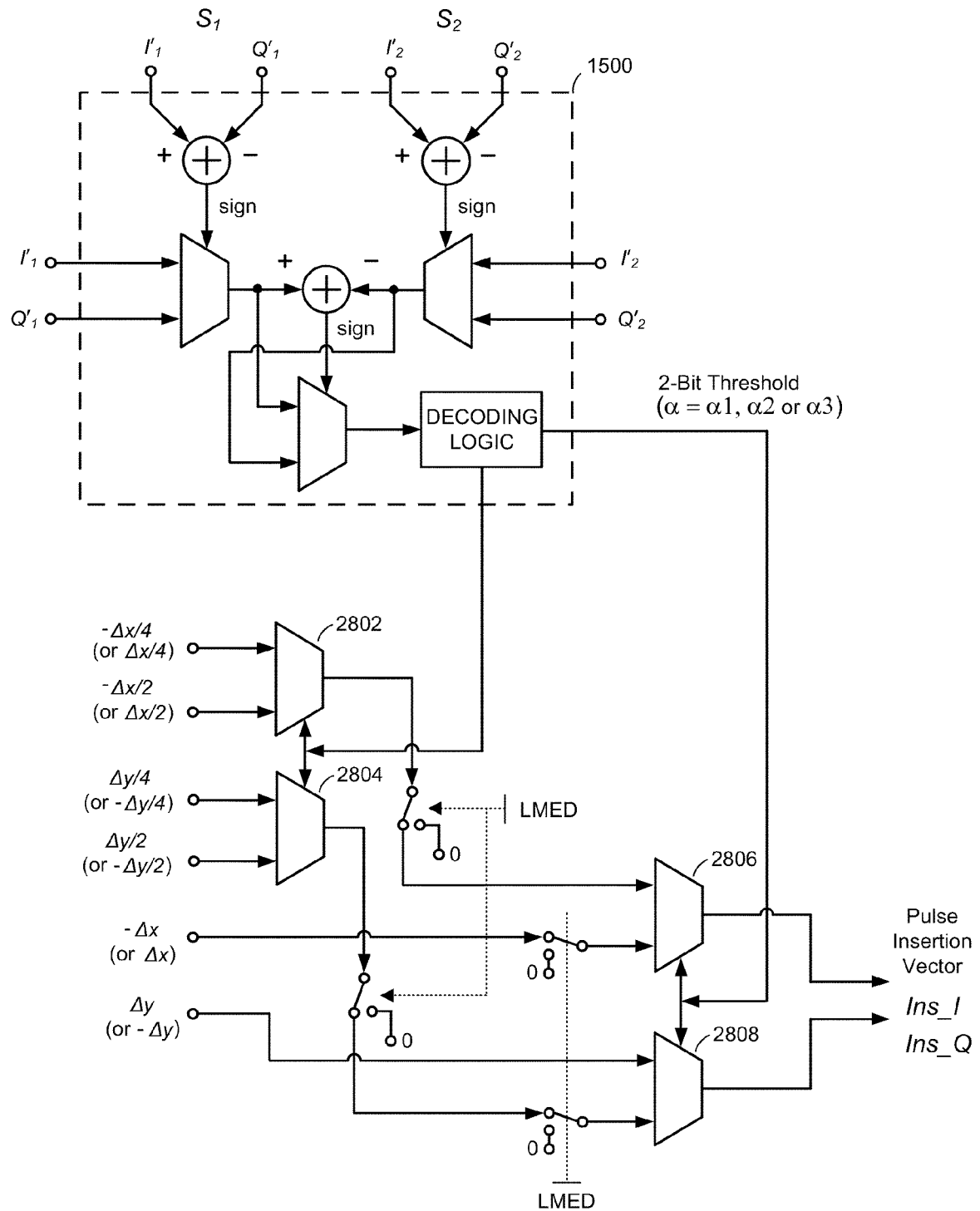
FIG. 28 is a schematic of an alternative pulse insertion vector generator circuit that may be used to form the pulse insertion vector (Ins_I, Ins_Q) during performance of the adaptive hole blowing method in FIG. 16.

In the circuit in FIG. 26, a plurality LUTs are used to store the sine and cosine information defining the threshold sample $(I_c, Q_c)$. The threshold sample from the appropriate pair of sine/cosine LUTs is then used to generate the desired pulse insertion vector (Ins_I, Ins_Q). In an alternative embodiment shown in FIG. 28, which does not require the use of sine/cosine LUTs, the pulse insertion vector (Ins_I, Ins_Q) is based directly on the selected orthogonal vector $(\Delta y, -\Delta x)$. Specifically, the pulse insertion vector (Ins_I, Ins_Q) is assigned the same direction as the selected orthogonal vector $(\Delta y, -\Delta x)$ and a magnitude that is one of three predefined fractions (in this example, ¼, ½ and 1) of the selected orthogonal vector $(\Delta y, -\Delta x)$ magnitude. Which of the three different magnitudes is selected is determined by which threshold level, α1, α2 or α3 the low-magnitude threshold α is set to. This approach obviates the need for the sine/cosine LUTs. Not requiring the sine/cosine LUTs can be beneficial if, for example, the read only memory needed to implement the LUTs is not readily available or if integrated circuit size constraints prevent or hinder integration or placement of the LUTs.

It should be emphasized that the methods and apparatus for generating the pulse insertion vector (Ins_I, Ins_Q) and forming the insertion pulse $(p_I(t), p_Q(t))$, once the low-magnitude threshold a has been set for a particular set of symbols, are merely exemplary. Other methods and apparatus for generating the pulse insertion vector (Ins_I, Ins_Q) and forming the insertion pulse $(p_I(t), p_Q(t))$, which with the benefit of this disclosure may be modified for use with the adaptive/variable low-magnitude threshold aspect of the present invention, are described in commonly assigned U.S. patent application Ser. Nos. 12/414,016, 12/482,913 and 12/508,477, all of which are hereby incorporated by reference.

Modifying the baseband signal s(t)=I(t)+jQ(t) by the scaled insertion pulses $(p_I(t), p_Q(t))$ results in a modified rectangular-coordinate baseband signal $\hat{s}(t)=\hat{I}(t)+j\hat{Q}(t)$ having a reduced AMR. The CORDIC converter 920 then converts this modified rectangular-coordinate baseband signal $\hat{s}(t)=\hat{I}(t)+j\hat{Q}(t)$ to polar-coordinate amplitude and angle component signals $\hat{\rho}(t)$ and $\hat{\theta}(t)$, as shown in FIG. 9. Due to the prior AMR-reducing operation performed by the AMR reduction circuit 904, the polar-coordinate amplitude and angle component signals $\hat{\rho}(t)$ and $\hat{\theta}(t)$ have reduced high-frequency content.

To complete the polar modulation and upconversion process and render a modulated RF carrier signal suitable for transmission over the air to a remote receiver, the polar-coordinate amplitude and angle component signals $\hat{\rho}(t)$ and $\hat{\theta}(t)$ from the AMR reduction circuit 904 are coupled to the amplitude modulation (AM) and phase modulation (PM) paths of the polar modulator 906. The AM path of the polar modulator 906 includes an AM path digital-to-analog converter (DAC) 932 an AM path analog low-pass filter (LPF) 934 and an amplitude modulator 936. The PM path includes a PM path DAC 938, a PM path analog filter 940, and an angle modulator 942. The AM and PM path DACs 932 and 938 convert the amplitude and angle component signals $\hat{\rho}(t)$ and $\hat{\theta}(t)$ to analog amplitude and phase modulation signals, respectively. The AM and PM path analog LPFs 934 and 940 then filter out undesirable DAC images created during the digital-to-analog conversion process. The resulting filtered amplitude modulation signal is fed to the amplitude modulator 936, while the resulting filtered angle modulation signal is fed to the angle modulator 942.

The amplitude modulator 936 modulates a direct current power supply voltage Vsupply according to the amplitude information in the filtered amplitude modulation signal. The resulting amplitude-modulated power supply signal Vs(t) is coupled to the power supply port of the polar modulator's power amplifier (PA) 944. Meanwhile, in the PM path the angle modulator 942 operates to modulate an RF carrier signal according to the angle information in the filtered angle modulation signal. The resulting angle-modulated RF carrier signal is applied to the RF input port RFin of the PA 944.

The PA 944 comprises an amplifier having a final-stage switch-mode type of PA (e.g., a Class D, E or F switch-mode PA) operating between compressed and cut-off states. As the PA 944 amplifies the angle-modulated RF carrier signal produced at the output of the angle modulator 942, the envelope information in the amplitude-modulated power supply signal Vs(t) from the amplitude modulator 936 is restored at the RF output RFout of the PA 944. Finally, an antenna 946 radiates the resulting amplified amplitude- and angle-modulated RF carrier signal over the air to a remote receiver.

Figure 29A:
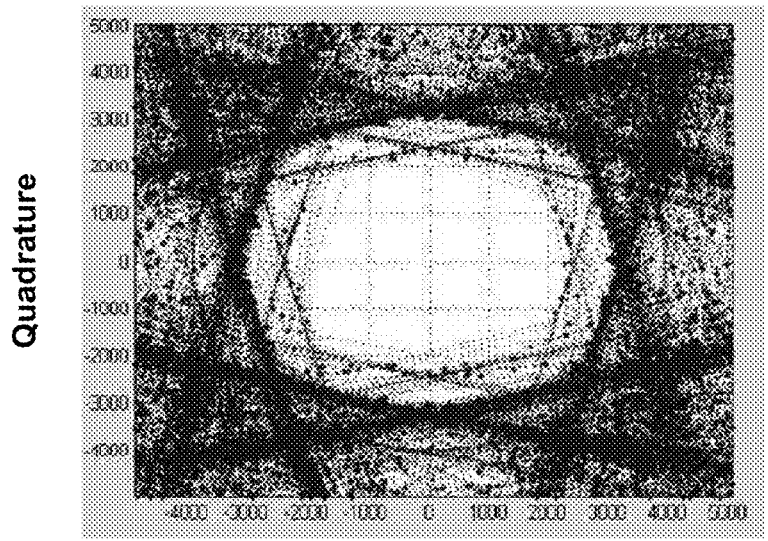
FIG. 29A is a signal trajectory diagram obtained from simulations performed on a polar transmitter, similar to the polar transmitter in FIG. 9, in which the polar transmitter was configured to process and transmit a representative High-Speed Uplink Packet Access (HSUPA) signal and the AMR reduction circuit was configured to perform adaptive hole blowing using a tri-level (α2, α2, α3) low-magnitude threshold α defined by a three-step step function $f(S)$, similar to that shown in FIG. 13.
Figure 29B:
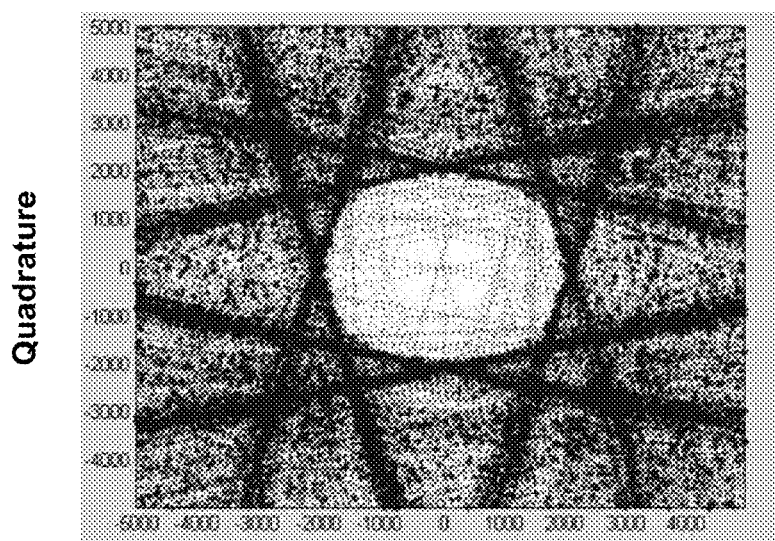
FIG. 29B is a signal trajectory diagram obtained from simulations performed on a polar transmitter configured to process and transmit the same representative HSUPA signal used in the simulations performed in connection with FIG. 29A, but with the polar transmitter configured to perform hole blowing using a single, fixed low-magnitude threshold.

FIG. 29A is a signal trajectory diagram obtained from simulations performed on a polar transmitter, similar to the polar transmitter 900 in FIG. 9, in which the polar transmitter 900 was configured to process and transmit a representative HSUPA signal and the AMR reduction circuit 904 was configured to perform adaptive hole blowing using a tri-level ($\alpha 2$, $\alpha 2$, $\alpha 3$) low-magnitude threshold a defined by a three-step step function $f(S)$, similar to that shown in FIG. 13. FIG. 29B is a signal trajectory diagram obtained from simulations performed on a polar transmitter configured to process and transmit the same representative HSUPA signal, but with the polar transmitter using a single, fixed low-magnitude threshold. Although faint, the three different hole sizes of radiuses of $\alpha 1$, $\alpha 2$ and $\alpha 3$ can be seen in the signal trajectory diagram in FIG. 29A. Simulation data on the two different configurations has also shown that the adaptive hole blowing approach of the present invention yields similar or lower upper and lower first adjacent (+/−5 MHz offset from uplink channel) channel leakage ratios (ACLR5s) compared to the fixed threshold approach, significantly lower upper and lower second ACLR10s (+/−10 MHz offsets from uplink channel), significantly lower receive band noise (R×N) at a 45 MHz frequency offset and higher, and similar or better in-band error vector magnitude (EVM) performance.

Figure 30:
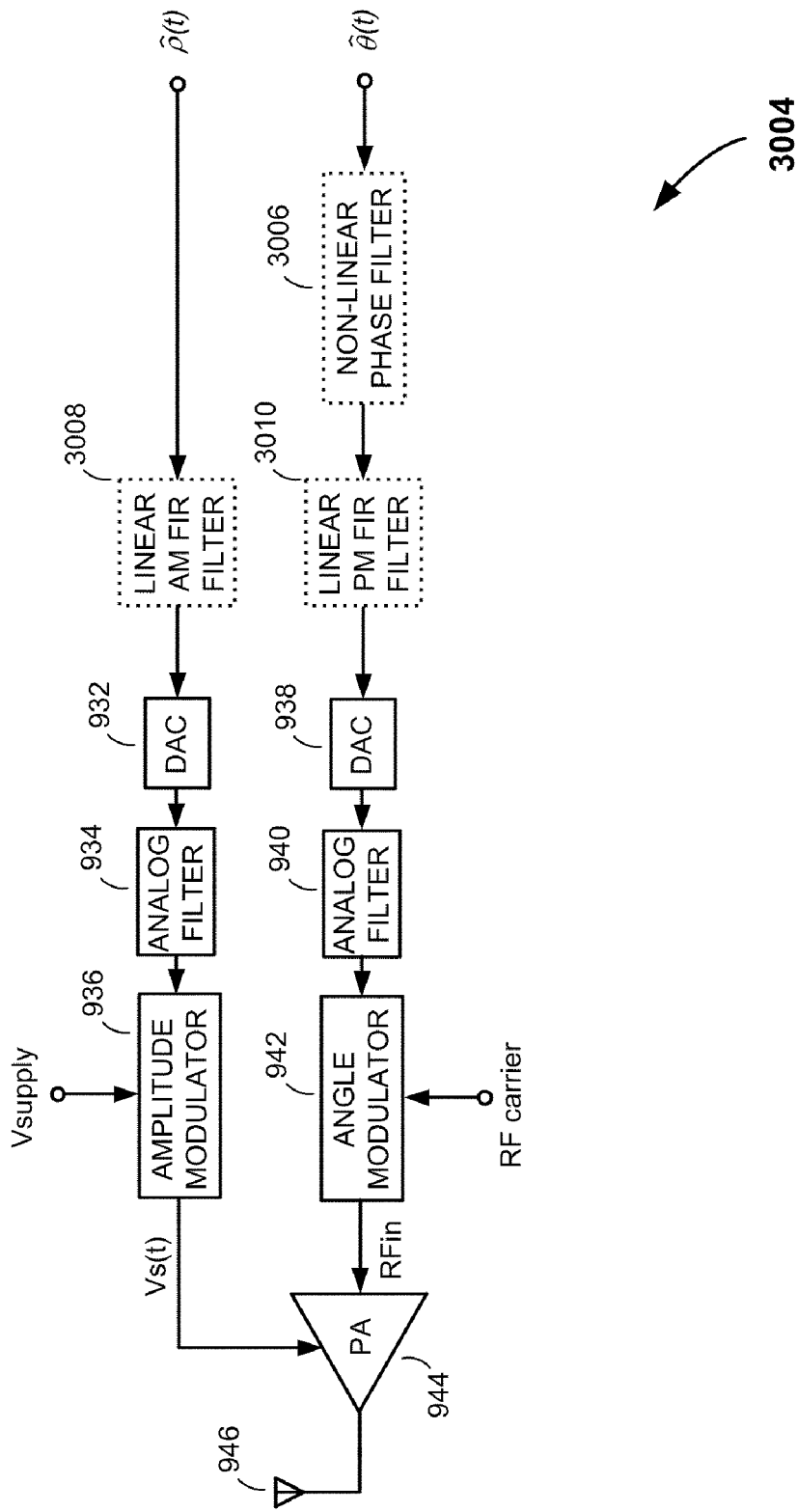
FIG. 30 is a diagram of a polar modulator that includes a phase modulation (PM)-path non-linear phase filter, an amplitude modulation (AM)-path linear finite impulse response (FIR) filter, and/or a PM-path linear FIR filter, and which may be substituted for the polar modulator of the polar transmitter in FIG. 9, in accordance with various embodiments of the present invention.

In accordance with other embodiments of the invention, further ACLR reduction (both first and second adjacent channels) and further R×N reduction are achieved by including one or more of the following in the AM and PM paths of the polar modulator 906: a PM-path non-linear phase filter 3006, an AM-path linear finite impulse response (FIR) filter 3008, and a PM-path linear FIR filter 3010. The inclusion of these various filters 3006, 3008 and 3010 is illustrated in the modified polar modulator 3004 in FIG. 30, where the dashed boxes are used to indicate that the filters are optional.

FIG. 31 is a table comparing the ACLR5s, ACLR10s, R×N45 and EVM of a polar transmitter configured to perform non-adaptive hole blowing (using a single, fixed low-magnitude threshold) on representative HSUPA signals (row labeled "HB w/o FIR") to the ACLR5s, ACLR10s, R×N45 and EVM of a polar transmitter similar to that in FIG. 9 (except also including a non-linear phase filter in the PM path) configured to perform adaptive hole blowing (using a tri-level ($\alpha 2$, $\alpha 2$, $\alpha 3$) low-magnitude threshold $\alpha$ defined by a three-step step function $f(S)$ similar to that shown in FIG. 13) on the same HSUPA signals (row labeled "Adaptive HB w/o FIR"). The ACLR5, ACLR10, R×N45 and EVM performance for the same polar transmitter, but which also includes various combinations of the AM-path linear FIR filter 3008 and a PM-path linear FIR filter 3010 are also included in the table. The results show that applying adaptive hole blowing reduces ACLR10 and R×N45 below that which is achievable without the benefit of adaptive hole blowing, even without additional AM-path or PM-path linear filtering, and without substantially increasing EVM. Further reduction in R×N with similar or better EVM performance is seen to be achieved by including either or both of the AM-path and PM-path linear FIR filters 3008 and 3010.

The adaptive hole blowing methods and apparatus of the present invention are well-suited for polar transmitters to reduce high frequency events in polar domain signals. They also compensate for PA memory effects and nonlinearity design characteristics. The adaptive hole blowing method maintains an "always on" transistor state to reduce PA memory effects of entering and exiting "off" transistor states, and reduces PA dynamic range usage at lowest output power where PA is highly nonlinear.

Figure 32:
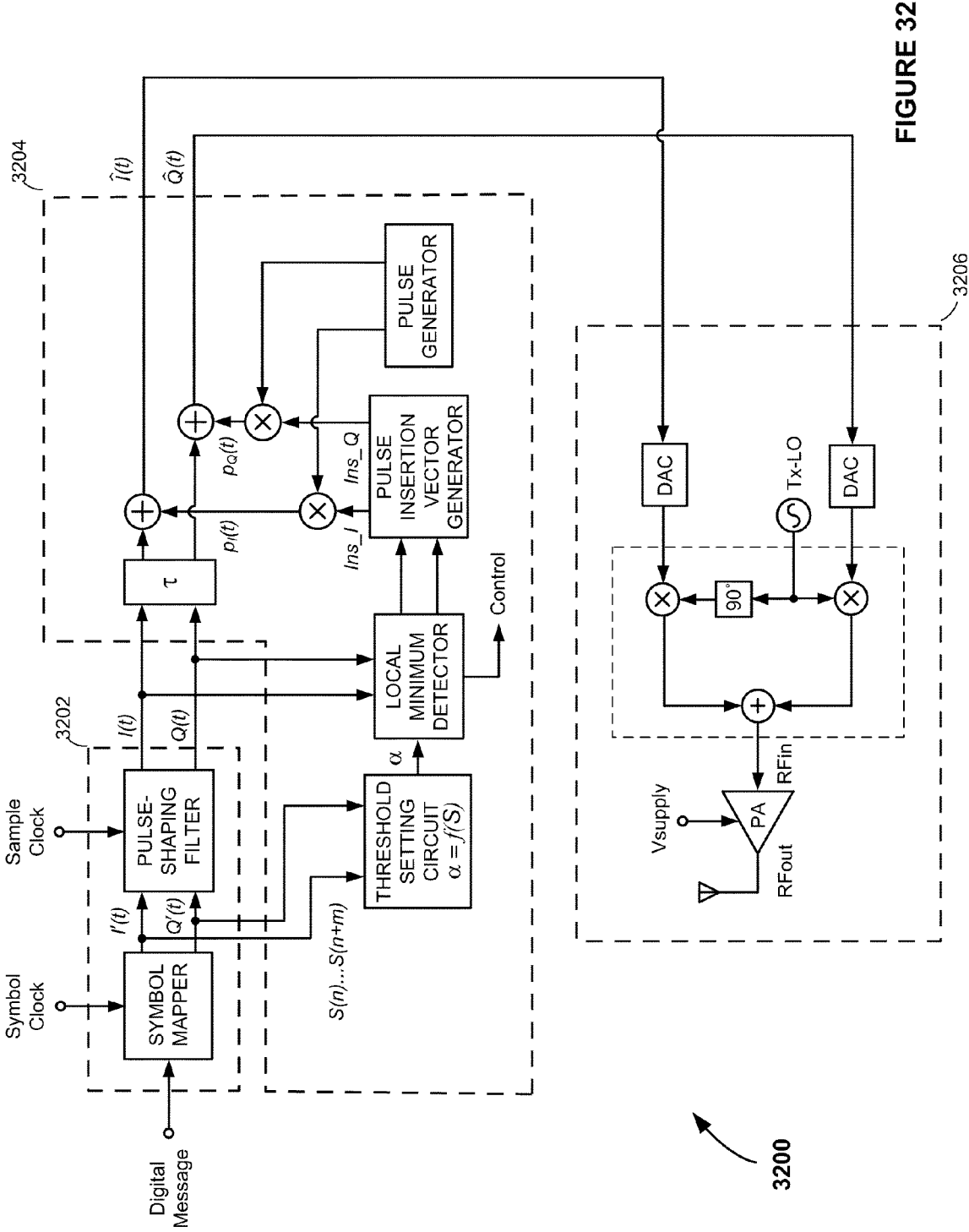
FIG. 32 is a drawing of a quadrature-modulator-based transmitter that is adapted to include an AMR reduction circuit configured to perform an adaptive hole blowing method, similar to the adaptive hole blowing method shown in FIG. 16, according to an embodiment of the present invention.

Though well-suited for polar transmitters, the adaptive hole blowing methods and apparatus of the present invention may also be used in other types of transmitters, such as the quadrature-modulator-based transmitter 3200 shown in FIG. 32. The quadrature-modulator-based transmitter 3200 comprises a baseband modulator 3202, an AMR reduction circuit 3204 (similar to the AMR reduction circuit 904 of the polar transmitter 900 in FIG. 9, except without the CORDIC converter 920) and a quadrature modulator 3206. The baseband modulator 3202 and AMR reduction circuit 3204 operate similar to how the baseband modulator 902 and AMR reduction circuit 904 of the polar transmitter 900 operate (with the exception of not converting the modified rectangular-coordinate baseband signal $\hat{s}(t)=\hat{I}(t)+j\hat{Q}(t)$ to polar coordinates), so a similar description is not provided here.

While various embodiments of the present invention have been described above, it should be understood that they have been presented by way of example, and not limitation. It will be apparent to persons skilled in the relevant art that various changes in form and detail may be made therein without departing from the spirit and scope of the invention. The scope of the invention should, therefore, be determined not with reference to the above description, but should instead be determined with reference to the appended claims, along with the full scope of equivalents to which such claims are entitled.

What is claimed is:

1. A communications transmitter, comprising:
   a symbol mapper configured to generate a sequence of symbols from a binary-source data stream containing a message to be transmitted;
   a pulse-shaping filter configured to generate a baseband signal based on said sequence of symbols;
   an average-to-minimum magnitude ratio (AMR) reduction circuit configured to compare magnitudes of samples of said baseband signal to a time-varying low-magnitude threshold that is varied at a rate equal to or dependent on a rate at which the symbol mapper generates the sequence of symbols, and modify said baseband signal to produce a modified baseband signal having a reduced AMR if a sample of said baseband signal is determined to have a magnitude less than said time-varying low-magnitude threshold; and
   a modulator configured to modulate a carrier signal based on modulation information contained in said modified baseband signal.

2. A method of reducing the average-to-minimum magnitude ratio (AMR) of a baseband signal in a communications transmitter, comprising:
   generating a sequence of symbols from a binary-source data stream containing a message to be transmitted;
   pulse shaping said sequence of symbols to form a baseband signal;
   sampling said baseband signal;
   setting a time-varying low-magnitude threshold;
   varying the time-varying low-magnitude threshold at a rate equal to or dependent on a rate at which the sequence of symbols are generated;
   detecting whether samples of said baseband signal have a magnitude less than said time-varying low-magnitude threshold; and
   upon detecting a sample of said baseband signal having a magnitude less than said time-varying threshold, modifying said baseband signal to produce a modified baseband signal having a lower AMR than said baseband signal.

3. A baseband circuit for a communications transmitter, comprising:
   a threshold setting circuit configured to generate a time-varying low-magnitude threshold at a rate equal to or dependent on a rate at which symbols representing the baseband signal are generated or received by the threshold setting circuit;
   a local minimum detector configured to compare magnitudes of samples of a baseband signal to said time-varying low-magnitude threshold;
   a circuit configured to generate an insertion pulse in response to said local minimum detector detecting a low-magnitude sample having a magnitude less than said time-varying low-magnitude threshold, and combine said insertion pulse with said baseband signal in the temporal vicinity of the detected low-magnitude sample to produce a modified baseband signal having a lower average-to-minimum magnitude ratio than that of said baseband signal.

4. The communications transmitter of claim 1 wherein said AMR reduction circuit includes a threshold setting circuit configured to generate said time-varying low-magnitude threshold as a function of one or more symbols in said sequence of symbols.

5. The communications transmitter of claim 4 wherein said function depends on a magnitude or magnitudes of said one or more symbols.

6. The communications transmitter of claim 4 wherein said function is a linear function of said one or more symbols.

7. The communications transmitter of claim 4 wherein said function is a non-linear function of said one or more symbols.

8. The communications transmitter of claim 1 wherein said AMR reduction circuit includes a threshold setting circuit configured to generate said time-varying low-magnitude threshold as a function of one or more samples of said baseband signal.

9. The communications transmitter of claim 8 wherein said function depends on a magnitude or magnitudes of said one or more samples.

10. The communications transmitter of claim 8 wherein said function is a linear function of said one or more samples.

11. The communications transmitter of claim 8 wherein said function is a non-linear function of said one or more samples.

12. The communications transmitter of claim 1 wherein said modulator comprises a polar modulator.

13. The communications transmitter of claim 1 wherein said modulator comprises a quadrature modulator.

14. The method of claim 2 wherein said time-varying low-magnitude threshold is a function of one or more symbols in said sequence of symbols.

15. The method of claim 14 wherein said function depends on a magnitude or magnitudes of said one or more symbols.

16. The method of claim 14 wherein said function is a linear function of said one or more symbols.

17. The method of claim 14 wherein said function is a non-linear function of said one or more symbols.

18. The method of claim 14 wherein said time-varying low-magnitude threshold is a function of one or more samples of said baseband signal.

19. The method of claim 18 wherein said function depends on a magnitude or magnitudes of said one or more samples.

20. The method of claim 18 wherein said function is a linear function of said one or more samples.

21. The method of claim 18 wherein said function is a non-linear function of said one or more samples.

22. The method of claim 2, further comprising varying said time-varying low-magnitude threshold at a rate equal to or dependent on a rate at which said sequence of symbols are generated.

23. The method of claim 2, further comprising varying said time-varying low-magnitude threshold at a rate equal to or dependent on a rate at which said baseband signal is sampled.

24. The method of claim 2, further comprising upconverting said modified baseband signal using a quadrature modulator.

25. The baseband circuit of claim 3 wherein said threshold setting circuit is configured to receive symbols representing said baseband signal and vary said time-varying low-magnitude threshold according to a function that depends on one or more symbols of said symbols.

26. The baseband circuit of claim 25 wherein said function depends on a magnitude or magnitudes of said one or more symbols.

27. The baseband circuit of claim 25 wherein said function is a linear function of said one or more symbols.

28. The baseband circuit of claim 25 wherein said function is a non-linear function of said one or more symbols.

29. The baseband circuit of claim 3 wherein said threshold setting circuit is configured to vary said time-varying low-magnitude threshold according to a function that depends on one or more samples of said baseband signal.

30. The baseband circuit of claim 29 wherein said function depends on a magnitude or magnitudes of said one or more samples.

31. The baseband circuit of claim 29 wherein said function is a linear function of said one or more samples.

32. The baseband circuit of claim 29 wherein said function is a non-linear function of said one or more samples.

* * * * *